(12) United States Patent
Martin et al.

(10) Patent No.: US 10,677,122 B2
(45) Date of Patent: Jun. 9, 2020

(54) METHOD AND SYSTEM FOR A PARTICULATE FILTER

(71) Applicant: Ford Global Technologies, LLC, Dearborn, MI (US)

(72) Inventors: Douglas Raymond Martin, Canton, MI (US); Tyler Kelly, Plymouth, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 15/699,889

(22) Filed: Sep. 8, 2017

(65) Prior Publication Data
US 2019/0078478 A1    Mar. 14, 2019

(51) Int. Cl.
| | |
|---|---|
| *F02M 26/15* | (2016.01) |
| *F01N 3/023* | (2006.01) |
| *B01D 46/00* | (2006.01) |
| *F02D 41/00* | (2006.01) |
| *F02M 26/05* | (2016.01) |
| *F02D 41/12* | (2006.01) |
| *F01N 9/00* | (2006.01) |
| *F02D 41/02* | (2006.01) |

(52) U.S. Cl.
CPC ....... *F01N 3/0233* (2013.01); *B01D 46/0063* (2013.01); *F01N 3/0236* (2013.01); *F01N 9/002* (2013.01); *F02D 41/0055* (2013.01); *F02D 41/123* (2013.01); *F02M 26/05* (2016.02); *F02M 26/15* (2016.02); *B01D 2279/30* (2013.01); *F01N 2410/04* (2013.01); *F01N 2430/00* (2013.01); *F01N 2900/08* (2013.01); *F01N 2900/1602* (2013.01); *F02D 41/029* (2013.01)

(58) Field of Classification Search
CPC ...... F01N 3/023; F01N 3/0232; F01N 3/0233; F01N 3/0236; F01N 3/031; F01N 3/032; F02M 26/15; B01D 46/0063; B01D 2279/30
USPC .................................. 60/278, 279, 296, 303
See application file for complete search history.

(56) References Cited

U.S. PATENT DOCUMENTS

| | | | |
|---|---|---|---|
| 5,065,574 A | 11/1991 | Bailey | |
| 8,388,712 B2 | 3/2013 | Zhang et al. | |
| 8,635,852 B2 | 1/2014 | Lupescu et al. | |
| 2001/0027647 A1* | 10/2001 | Hirota | B01D 53/9431 60/297 |
| 2002/0157387 A1* | 10/2002 | Hirota | B01D 46/0041 60/296 |
| 2002/0162324 A1* | 11/2002 | Hirota | B01D 46/002 60/297 |
| 2009/0308060 A1 | 12/2009 | Suzuki et al. | |
| 2010/0199839 A1* | 8/2010 | Zhang | F01N 3/0233 95/23 |

(Continued)

*Primary Examiner* — Erick R Solis
(74) *Attorney, Agent, or Firm* — Geoffrey Brumbaugh; McCoy Russell LLP

(57) ABSTRACT

Methods and systems are provided for regenerating and purging a particulate filter of an exhaust treatment system for a combustion engine. In one example, a method may include flowing exhaust gas in a reverse direction through the particulate filter to purge particulate matter to an intake manifold of the engine for combusting. The duration of purging may be based on a regeneration achieved during a previous regeneration of the particulate filter during a deceleration fuel shut-off event.

18 Claims, 6 Drawing Sheets

(56) References Cited

U.S. PATENT DOCUMENTS

| | | | |
|---|---|---|---|
| 2010/0293921 A1* | 11/2010 | Yamato | B01D 53/9445 |
| | | | 60/273 |
| 2018/0066595 A1* | 3/2018 | Dudar | F02D 41/0037 |
| 2018/0171898 A1* | 6/2018 | Ulrey | F02M 26/04 |

* cited by examiner

| GPF Mode | GPF Bypass Valve | GPF Flow Direction Selector Valve | GPF Recirculation Valve | Direction of Exhaust Flow | Operating conditions |
|---|---|---|---|---|---|
| Bypass | Position 1 | Position 1 | Position 1 | From engine through GPF bypass, to tailpipe | Warm engine temperature, low particulate emissions |
| Forward Flow | Position 2 | Position 1 | Position 1 | From engine through GPF in a forward direction to tailpipe | May include DFSO, peak power, enrichment, cold start, compression injection |
| Reverse Flow | Position 1 | Position 2 | Position 2 | From engine through GPF in a reverse direction to intake manifold | Warm engine temperature, low particulate emissions, low-mid engine speed/load |

FIG. 3

METHOD AND SYSTEM FOR A PARTICULATE FILTER

FIELD

The present description relates generally to methods and systems for removing soot from a particulate filter of an exhaust treatment system for a combustion engine.

BACKGROUND/SUMMARY

Engine exhaust systems utilize emissions control devices to treat exhaust gas of internal combustion engines, reducing the amount of particulate emissions released to atmosphere. Emission control devices typically include particulate filters and catalytic converters. For example, three way catalytic converters (TWC) that are capable of reducing NOx may be included in the emission control device. In addition, particulate filters (PF) may be often positioned downstream of the TWC to collect particulate matter, including carbon particles from incomplete combustion (e.g., soot and ash). As particulate matter accumulates in the filters, there is a gradual increase in restriction of exhaust gas flow. When the particulate filter becomes sufficiently loaded with soot, an unfavorable exhaust backpressure may be generated that can adversely affect combustion, emissions, and engine performance.

To reduce exhaust backpressure related issues, particulate filters may be periodically regenerated. For example, the filter may be regenerated opportunistically during vehicle driving. For example, during conditions when the engine is operating in a deceleration fuel shut-off (DFSO) mode, the exhaust gas may passively reach regeneration temperatures (e.g. above 450° C., for example). Flow of this hot exhaust gas through the particulate filter can cause at least some of the carbon particles accumulated in the filter to incinerate, and the combustion products may be expelled to atmosphere. However, passive regeneration opportunities may be infrequent since they rely on DFSO occurrence. In one example, if DFSO events do not occur frequently due to the vehicle operating at high loads for an extended duration, filter regeneration may be compromised. In additional examples, the particulate filter may be actively regenerated, wherein engine operation may be intrusively adjusted to raise exhaust temperatures and facilitate soot incineration. For example, the engine may be operated rich and lean (relative to stoichiometry) sequentially to actively burn off the soot. In still further examples, fuel may be injected into the exhaust proximate the filter while the engine is operated lean so as to burn the soot locally at the filter. However, the reliance on rich/lean engine operation during active regeneration can result in a drop in fuel economy.

Still another attempt to manage the soot load of a particulate filter includes routing exhaust gas through the exhaust treatment system to an engine intake via an exhaust gas recirculation (EGR system), as shown by Lupescu et al. in U.S. Pat. No. 8,635,852. Therein, Lupescu discloses an exhaust treatment system configured to purge stored hydrocarbons and particulate matter from a trap assembly including a particulate filter to an engine intake via an EGR passage of the EGR system.

However, the inventors herein have recognized potential issues with such systems. As one example, it may be difficult to reconcile the purge flow required to regenerate the filter with EGR flow requirements. In particular, based on engine operating conditions, an EGR valve may be frequently and rapidly transitioned between a high flow setting (e.g., a setting that provides 7-20% mass flow) and a low flow setting (e.g., a setting that provides 2% mass flow). The rapid and significant change in EGR flow setting allows pumping losses to be reduced, improving the fuel economy associated with EGR usage. However, the same change to the flow setting for purged HCs can result in combustion instability. As another example, in the approach of Lupescu, filter regeneration may not be completed if there are intermittent torque transients. For example, if there is a tip-out to idle conditions while the filter is being purged to the intake, the EGR valve may be closed since the EGR tolerance of the engine at idle conditions is low, and further due to the interference of the EGR valve opening on manifold vacuum generation. As a result, further purging may of the filter may terminate, even though the purge tolerance of the engine at the idle conditions is higher than the EGR tolerance.

In one example, the issues described above may be addressed by a method comprising: while spinning an engine fueled, purging soot from a loaded particulate filter to an engine intake using reverse flow of exhaust gas through the filter; and while spinning the engine unfueled, regenerating soot from the loaded particulate filter and flowing to a tailpipe using forward flow of air through the filter. In this way, purging and regenerating may be performed in coordination with one another such that soot loading of the particulate filter may be reduced as efficiently as possible.

As one example, an exhaust system may include an emission control device having a three way catalyst (TWC) upstream of a gasoline particulate filter (GPF). The exhaust system may include an exhaust manifold leading to a branched exhaust passage system including multiple exhaust valves for controlling a direction of exhaust flow through the emission control device. For example, a first exhaust passage may direct exhaust from the exhaust manifold to the emission control device via an exhaust turbine and/or via a waste-gate passage bypassing the turbine. The exhaust may flow to a tailpipe upon flowing in a forward direction through the emission control device (that is, from the inlet to the outlet of the GPF and thereon through the TWC). A further bypass exhaust passage may be coupled to the first exhaust passage, downstream of the turbine, for directing exhaust gas to the tailpipe while bypassing the emission control device. A bypass valve coupled at a junction of the first exhaust passage and the bypass passage may be used to direct exhaust through the first exhaust passage or the bypass passage. A second exhaust passage may couple the exhaust manifold to the first exhaust passage at a location downstream of the TWC. A flow selector valve coupled at a junction of second exhaust passage and the first exhaust passage may be used to direct exhaust to the tailpipe through the first exhaust passage (while bypassing the emission control device) or into the outlet of the GPF so as to enable reverse flow of exhaust through the GPF. A third exhaust passage may couple the inlet of the GPF to an intake manifold, at a location downstream of an intake compressor. The third exhaust passage may include a recirculation valve which is used to direct exhaust drawn from the inlet of the GPF into the intake manifold. At any given time, a larger portion of the total exhaust flow from the exhaust manifold may be directed into the first exhaust passage relative to the second exhaust passage.

Based on engine operating conditions, a position of each of the valves may be adjusted to enable one of forward flow, reverse flow, or bypass flow through the emission control device. For example, during conditions when neither soot loading or unloading is required at the GPF, the valve positions may be adjusted to enable exhaust to be directed into the bypass passage, while bypassing the GPF. As another example, during conditions when soot loading is required at the GPF, the valve positions may be adjusted to enable all the exhaust to be directed into the first exhaust passage and from there to flow in a first, forward direction through the GPF (from an inlet to an outlet of the GPF and from thereon into the TWC) wherein exhaust PMs are stored on the GPF. At this time, no exhaust is directed into the second exhaust passage. Also, during conditions when soot unloading is required at the GPF and a DFSO opportunity is available, the valve positions may be adjusted to enable the first, forward directional flow through the GPF via the first exhaust passage so that passive regeneration can be advantageously used to incinerate soot at the filter. During conditions when soot unloading is required at the GPF and a DFSO opportunity is not available, such as when the engine is running fueled, the valve positions may be adjusted to enable a portion of the total exhaust flow (e.g., 10-20% of the total flow) to be directed into the second exhaust passage and from there to flow in a second direction, opposite the first direction, through the GPF (from the outlet to the inlet of the GPF) before flowing the exhaust to the intake manifold. Herein exhaust PMs are drawn off the lattice structure of the GPF during the exhaust flow and are directed into the engine intake manifold where they are incinerated along with injected fuel during cylinder combustion.

In this way, particulate filter cleaning may be improved. By flowing at least a portion of exhaust through the filter in a reverse direction (in a filter loading direction), soot collected on the filter may be gradually removed from the filter and purged to an engine intake manifold. By adjusting exhaust system valves to enable the reverse flow to occur while the engine is operating fueled, the filter may be cleaned over a larger portion of a drive cycle, albeit at a slower rate. By providing the reverse flow via a dedicated GPF recirculation passage and GPF recirculation valve, the higher tolerance of the engine for low purge flow can be leveraged to purge the filter slowly, but more completely, without affecting combustion stability or manifold vacuum generation, particularly at idling conditions. By also enabling forward flow through the filter during conditions when the engine is operated unfueled, such as a DFSO, the filter can also be cleaned opportunistically at a higher rate. By coordinating the removal of soot using reverse flow through the filter with the removal of soot using forward flow through the filter over different conditions of a drive cycle, a more complete cleaning of the filter can be achieved, reducing the need for active regeneration of the filter, and the associated fuel penalty. By also adjusting the recirculation of exhaust gases to the engine intake based on the ingestion of soot from the GPF at the engine, disruption of filter regeneration due to sudden torque transients can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a summary table of the different exhaust system valve configurations in each of the operating modes of FIGS. 2A-2C.

DETAILED DESCRIPTION

The following description relates to systems and methods for operating an exhaust treatment system of an internal combustion engine including a particulate matter filter. An engine controller may be configured to perform a control routine, such as the example routine of FIG. 5, to operate the engine exhaust system in one of a plurality of operating modes (FIGS. 2A-2C and 3) to provide forward flow or reverse flow of exhaust through the GPF. The engine controller may be further configured to perform the example routine of FIG. 4, to coordinate regeneration of the GPF during DFSO with purging of the GPF to an engine intake during fueled engine operation. An example of engine operation and filter soot removal is shown with reference to FIG. 6.

Figure 1:
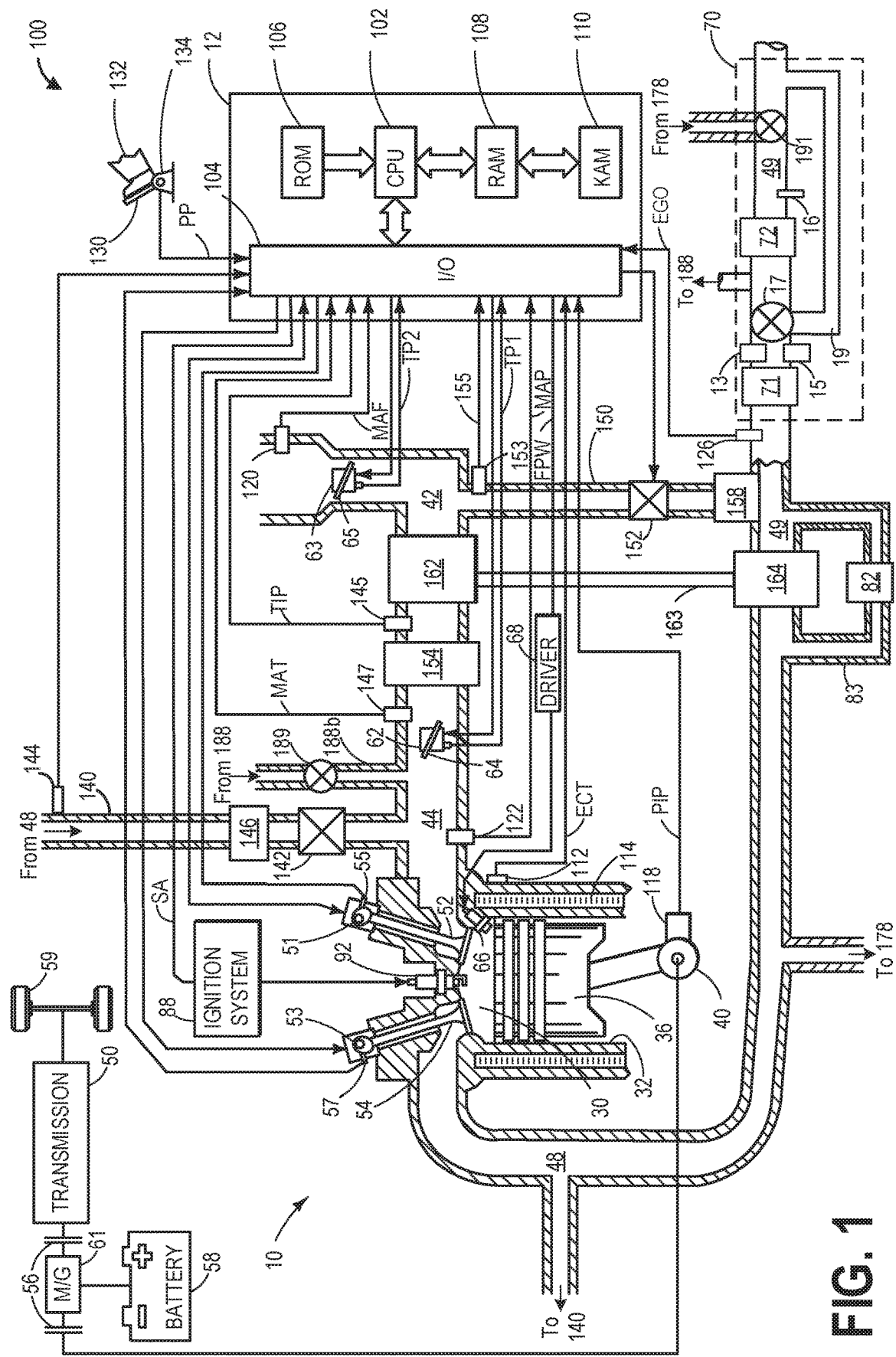
FIG. 1 shows a schematic depiction of an internal combustion engine including an emission control device, the emission control device including a gasoline particulate filter (GPF).

Turning now to FIG. 1, it shows a schematic diagram of a vehicle 100 comprising one cylinder of multi-cylinder engine 10, which may be included in a propulsion system of the vehicle 100. In some examples, vehicle 100 may be a hybrid vehicle with multiple sources of torque available to one or more vehicle wheels 59. In other examples, vehicle 100 is a conventional vehicle with only an engine, or an electric vehicle with only electric machine(s). In the example shown, vehicle 100 includes engine 10 and an electric machine 61. Electric machine 61 may be a motor or a motor/generator. Crankshaft 40 of engine 10 and electric machine 61 are connected via a transmission 50 to vehicle wheels 59 when one or more clutches 56 are engaged. In the depicted example, a first clutch 56 is provided between crankshaft 40 and electric machine 61, and a second clutch 56 is provided between electric machine 61 and transmission 50. Controller 12 may send a signal to an actuator of each clutch 56 to engage or disengage the clutch, so as to connect or disconnect crankshaft 40 from electric machine 61 and the components connected thereto, and/or connect or disconnect electric machine 61 from transmission 50 and the components connected thereto. Transmission 50 may be a gearbox, a planetary gear system, or another type of transmission. The powertrain may be configured in various manners including as a parallel, a series, or a series-parallel hybrid vehicle.

Electric machine 61 receives electrical power from a traction battery 58 to provide torque to vehicle wheels 59.

Electric machine 61 may also be operated as a generator to provide electrical power to charge battery 58, for example during a braking operation.

Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the present example, each cylinder 30 includes a corresponding intake valve 52 and an exhaust valve 54. Each intake valve 52 and exhaust valve 54 may be held at a desired position via a corresponding spring. Engine 10 further includes one or more camshafts (not shown) for operating intake valve 52 and/or for operating exhaust valve 54. In one example, intake camshaft may be coupled to intake valve 52 and can be actuated to operate intake valve 52. In another example, exhaust camshaft may be coupled to exhaust valve 54 and can be actuated to operate exhaust valve 54. In some embodiments, where the intake valve of a plurality of cylinders 30 are coupled to a common camshaft, intake camshaft may be actuated to operate the intake valves of all the coupled cylinders.

Intake valve 52 is actuatable between an open position that allows intake air into the corresponding cylinder and a closed position substantially blocking intake air from the cylinder. Intake camshaft (not shown) may be included in intake valve actuation system which is in communication with controller 12. Intake camshaft may include an intake cam which has a cam lobe profile for opening intake valve 52 for a defined intake duration. In some embodiments (not shown), the camshaft may include additional intake cams with an alternate cam lobe profile that allows the intake valve 52 to be opened for an alternate duration (herein also referred to as a cam profile switching system). Based on the lobe profile of the additional cam, the alternate duration may be longer or shorter than the defined intake duration of intake cam.

In the same manner, each exhaust valve 54 is actuatable between an open position allowing exhaust gas out of the corresponding cylinder and a closed position substantially retaining gas within the cylinder and blocking the exit of exhaust gases from the cylinder. Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include intake throttle 62 in addition to air intake system throttle 63, throttles 62 and 63 having throttle plates 64 and 65, respectively. Intake throttle 62 is located downstream of an intake compressor and varies the amount of air directed to an engine cylinder from the intake manifold. Air intake system throttle 63 is located upstream of the intake compressor and varies the amount of air directed into the intake manifold, and into the compressor. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP1 and TP2, respectively. Pressure, temperature, and mass air flow may be measured at various points along intake passage 42 and intake manifold 44. For example, intake passage 42 may include a mass air flow sensor 120 for measuring clean air mass flow entering through throttle 63. The measurement of clean air mass flow may be communicated to controller 12 via a MAF signal. Further, a pressure of the air charge within the intake manifold 44 may be sensed via the manifold absolute pressure sensor 122 and a MAP signal may be communicated to controller 12. A temperature of the air charge within intake manifold 44 may be measured by manifold air temperature sensor 147, and the measurement may be conveyed to controller 12 as a MAT signal.

Engine 10 may further include an intake air compression device such as a turbocharger or supercharger including at least a compressor 162 arranged upstream of intake manifold 44. For a turbocharger (as depicted), compressor 162 may be at least partially driven by a turbine 164 (e.g., via a shaft) arranged along exhaust passage 49. For a supercharger (not shown), compressor 162 may be at least partially driven by the engine and/or an electric machine, and may not include a turbine. A charge air cooler 154 may be included downstream from compressor 162 and upstream of intake valve 52. Charge air cooler 154 may be configured to cool charge air that has been heated by compression via compressor 162, for example. Charge air cooler 154 may be upstream of throttle 62. Further, a pressure of compressed air upstream of intake throttle 63 and downstream of compressor 162 may be sensed by a throttle inlet pressure (TIP) sensor 145. Specifically, TIP is indicative of boost levels or boost pressure in the engine system.

Exhaust gases exiting combustion chambers 30 and exhaust manifold 48 spin exhaust turbine 164 which is coupled to compressor 162 along shaft 163. The amount of compression provided to one or more cylinders of the engine via turbocharger may be varied by controller 12 by adjusting the amount of exhaust directed through turbine 164. When reduced turbine torque is desired, some exhaust flow may be directed through waste-gate passage 83 bypassing the turbine by adjusting the position of a waste-gate valve 82. By adjusting a position of waste-gate valve 82 via controller 12, an amount of boost provided by the turbocharger may be controlled. Thus, the waste-gate valve 82 may be a boost actuator. For example, controller 12 may provide a signal responsive to a demand for increased boost pressure, the signal reducing an opening of the waste-gate valve. The combined flow from the turbine 164 and the waste-gate valve 82 may then flow through emission control device 70.

Engine system 100 may further include an EGR system for routing a desired portion of exhaust gas from exhaust manifold 48 and/or exhaust passage 49 to intake manifold 44. FIG. 1 shows a high pressure exhaust gas recirculation system (HP-EGR system) and a low pressure EGR system (LP-EGR system). The HP-EGR is routed through HP-EGR passage 140 from upstream of turbine 164 to downstream of compressor 162. The amount of HP-EGR provided to intake manifold 44 may be varied by controller 12 via adjustments to an opening of HP-EGR valve 142. The HP-EGR system may include HP-EGR cooler 146 to reject heat from the HP-EGR gases to engine coolant, for example. Under some conditions, the EGR system may be used to regulate the temperature of the air and fuel mixture within combustion chamber 30. Thus, it may be desirable to measure or estimate the EGR mass flow. EGR sensors may be arranged within the EGR passages and may provide an indication of one or more of mass flow, pressure, temperature, concentration of $O_2$ (or engine dilution), and concentration of the exhaust gas. For example, an HP-EGR sensor 144 may be arranged within HP-EGR passage 140. As elaborated herein, at least an amount of HP-EGR may also be adjusted during torque transients to increase boosted engine response.

LP-EGR is routed through LP-EGR passage 150 from downstream of turbine 164 to upstream of compressor 162. The amount of LP-EGR provided to intake passage 42 may be varied by controller 12 via LP-EGR valve 152. Similar to the HP-EGR system, the LP-EGR system may include LP-EGR cooler 158 to reject heat from the LP-EGR gases to engine coolant, as well as a LP-EGR sensor 153 arranged within the LP-EGR passage 150.

Depending on operating conditions, LP-EGR valve 152 and HP-EGR valve 142 may be opened (e.g., an opening of the EGR valves may be increased) to admit a controlled amount of cooled exhaust gas to the intake passage for desirable combustion and emissions-control performance. As such, LP-EGR valve 152 and HP-EGR valve 142 may be actuated by an actuator (e.g., electric, mechanical, hydraulic, etc.) based on commands received from controller 12.

Emission control device (ECD) 70 is shown arranged along exhaust passage 49 downstream of exhaust manifold 48 and downstream of compressor 162. Exhaust passage 49 connects to a tailpipe. Exhaust gas sensor 126 is shown coupled to exhaust passage 49 upstream of emission control device (ECD) 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

In this example, ECD 70 includes a catalyst, which may be a three way catalytic converter (TWC) 71, and further includes a gas particulate filter (GPF) 72. One or more sensors may be coupled upstream, downstream, or to a body of ECD 70. For example, a catalyst monitor sensor 13, a pressure sensor 15, and a temperature sensor 16 may be coupled to ECD 70. It will be appreciated that one or more of the sensors shown in FIG. 1 may be omitted and/or repositioned.

GPF 72 may include one or more catalyst materials in addition to components configured to filter particulate matter from exhaust gas. For example, GPF 72 may be coated with a wash-coat including one or more catalyst materials. Such a configuration may be employed for embodiments in which engine 10 is spark-ignited, for example. In some embodiments, the TWC 71 and GPF 72 may be separate components comprising separate housings positioned away from one another (e.g., the TWC being upstream of the GPF as shown). TWC 71 and GPF 72 are shown arranged along exhaust passage 49 downstream of exhaust gas sensor 126. It will be appreciated that TWC 71 and GPF 72 may alternately be any one of a three way catalyst (TWC), NO, trap, an SCR catalyst, an oxidation catalyst, or an alternative gas treatment device, or combinations thereof. Additionally, it will be appreciated that GPF 72 may be a gasoline particulate filter or any other type of particulate filter, including a diesel particulate filter (DPF). In some embodiments, GPF 72 may be located downstream of TWC 71 (as shown in FIG. 1), while in other embodiments, GPF 72 may be positioned upstream of TWC 71 (not shown in FIG. 1). It will be understood, however, that ECD 70 is provided as a non-limiting example and that, in other embodiments, the ECD may include other components without departing from the scope of this disclosure.

One or more exhaust treatment system valves (or GPF valves) may be included to adjust a direction of exhaust flow through ECD 70. As elaborated with reference to FIGS. 2A-2C, and FIG. 5, by adjusting the position of the various valves, an operating mode of the ECD may be varied, enabling particulate matter stored on the GPF to either be burned locally before being released to the tailpipe, or for the particulate matter to be ingested into the engine intake and incinerated in the cylinder. For example, the one or more exhaust treatment system valves may include a GPF bypass valve 17, a GPF flow direction selector valve 191, and a GPF recirculation valve 189, as described below.

GPF bypass valve 17 (e.g., bypass valve) may be positioned within a bypass passage 19 coupled to the exhaust passage 49, the bypass coupling a location upstream of GPF 72 with a location immediately downstream of the GPF (e.g., at the GPF outlet, as shown). In this way, bypass 19 is disposed around GPF 72. However, in other examples, bypass passage 19 may be coupled to the tailpipe instead of being coupled to the GPF outlet. GPF bypass valve 17 may be a continuously variable valve, whose position may be adjusted to a fully open position, a fully closed position, or any position there-between. Further details regarding GPF valve positioning is provided below with reference to FIGS. 2A-2C and FIG. 3.

GPF flow direction selector valve 191 is coupled to exhaust passage 49, downstream of GPF 72. Selector valve 191 is also coupled to reverse flow passage 178. As elaborated at FIGS. 2A-2C, reverse flow passage 178 is configured to receive exhaust gas from exhaust manifold 48 and flow it in a reverse direction through GPF 72, the reverse direction defined herein as from an outlet to an inlet of the particulate filter. Flow direction selector valve 191 may be configured to control the flow of exhaust gas from reverse flow passage 178 into GPF 72 in exhaust passage 49. Specifically, when GPF flow direction selector valve 191 is actuated to a first position that allows reverse exhaust gas flow, exhaust passage 49 may be fluidically coupled to reverse flow passage 178 via selector valve 191, and exhaust gas may flow from exhaust manifold 48 into reverse flow passage 178, thereon into exhaust passage 49 and then the outlet of GPF 72. Exhaust gas then flows out of the outlet of GPF 72 before flowing to the engine intake manifold via GPF recirculation passage 188. In comparison, when GPF flow direction selector valve 191 is actuated to a second position that disables reverse exhaust gas flow, exhaust passage 49 may be decoupled from reverse flow passage 178. During such conditions, only forward flow through the GPF, or bypass flow around the GPF, may be possible. GPF recirculation valve 189 is depicted along GPF recirculation passage 188 that couples the exhaust treatment system to the intake manifold 44. In particular, recirculation passage 188 couples exhaust passage 49, at a location upstream of an inlet of GPF 72, to intake manifold 44, downstream of compressor 162. When GPF recirculation valve 189 is open, exhaust gas received at the inlet of GPF 72 via reverse flow through GPF 72, may flow through recirculation passage 188 and enter intake manifold 44. In this way, the reverse flowing exhaust gas may purge particulate matter from the GPF 72 into combustion chambers of the engine. GPF recirculation valve 189 may be a fully variable valve, which may be adjusted to a fully open position, a fully closed position, or any position there-between. In this way, the GPF recirculation valve 189 may throttle the amount of purge flow from the particulate filter into the intake manifold 44.

The catalyst monitor sensor 13 may be a HEGO (heated exhaust gas oxygen) sensor, but it will be appreciated that another suitable type of exhaust gas sensor may be used to monitor the catalyst. Pressure sensor 15 may be positioned upstream of the GPF 72. In this way, the output of pressure sensor 15 may provide an indication to the vehicle controller 12 of a level of exhaust backpressure from the GPF 72, which may be a further indication of a soot load on the filter. For example, if the GPF 72 has a higher soot load, there may exist an increased backpressure upstream of the GPF 72. Temperature sensor 16 may be coupled to PF 72 (e.g., downstream, upstream, or across) in order to monitor a temperature of the particulate filter. Specifically, output from the temperature sensor 16 may provide an indication of exhaust temperature to the controller 12. If the measured exhaust temperature is higher than a threshold temperature, it may be determined that the exhaust is hot enough to enable passive regeneration of the filter. In some examples, the exhaust temperature may be the temperature proximate the outlet of the GPF 72, or it may be the temperature of the particulate filter medium itself. It will be appreciated that a temperature sensor may additionally or optionally be placed upstream of the particulate filter in order to monitor a temperature gradient of an exothermic reaction occurring in the particulate filter during a regeneration, for example. In yet another example, temperature sensor 16 may be positioned within the GPF 72.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle positions (TP1 and TP2) from throttle position sensors; boost pressure from a throttle inlet pressure (TIP) sensor 145; and manifold absolute pressure signal, MAP, from manifold absolute pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall effect sensor 118, which is also used as an engine speed sensor, may produce a predetermined number of equally spaced pulses each and every revolution of the crankshaft.

Based on the signals received from the various sensors of FIG. 1, and instructions stored on a memory of the controller, controller 12 employs the various actuators of FIG. 1 to adjust engine operation. As an example, responsive to temperature input from an exhaust temperature sensor and/or pressure input from a pressure sensor coupled to PF 72, controller 12 may send a signal to adjust the opening of the various exhaust system valves, thereby varying the direction of exhaust flow through the PF. Likewise, controller 12 may send signals to actuate GPF bypass valve 17, GPF flow direction selector valve 191, GPF recirculation valve 189, throttle plates 64 and 65, LP-EGR valve 152, HP-EGR valve 142, VCT actuator, intake and exhaust valves 52 and 54, respectively, waste-gate valve 82, etc.

Responsive to indications that the engine temperature and engine exhaust temperature are above their respective thresholds, and responsive to an indication that the feed-gas soot level is below its threshold, the controller may send a command signal to adjust the opening of GPF valves to allow reverse flow through the GPF in order to purge particulate matter to the engine. In one example, adjusting the opening of the GPF valves may include the controller sending a control signal to GPF bypass valve 17 to increase the amount of forward-flowing exhaust gas bypassing the GPF 72. As another example, adjusting the opening of the GPF valves may include the controller sending a control signal to increase the opening of the GPF recirculation valve 189 to allow exhaust gas from the GPF 72 to enter the intake manifold 44, and sending a command signal to actuate the GPF flow direction selector valve 191 to a position that allows exhaust gas to flow in a reverse direction through the GPF 72. GPF valves may be actuated at the same time or sequentially in a predetermined sequence. As a result, the amount of exhaust gas flowing in a reverse direction through the GPF 72 may increase, thereby purging particulate matter from the GPF 72 to the intake manifold 44 of the engine 10 for subsequent combustion when the engine is running fueled. In this way, responsive to engine operating conditions, the particulate matter load of the particulate filter may be opportunistically decreased in order to prolong its usable life.

As another example, the controller may make a logical determination (e.g., regarding a position of GPF valves) based on logic rules that are a function of an exhaust backpressure proximate the GPF. Responsive to an indication of the exhaust backpressure at or upstream of the GPF (as may be indicated by the output of pressure sensor 15) after a DFSO event relative to an exhaust backpressure threshold, the controller may then generate a control signal that is sent to actuators of the GPF valves in order to actuate the GPF valves into positions to facilitate bypassing the GPF, as described in reference to FIG. 2C.

In this way, the components of FIG. 1 enable an engine system including: an engine having an intake manifold and an exhaust manifold; a turbocharger having a turbine coupled to the exhaust manifold, a compressor coupled to the intake manifold, a shaft mechanically coupling the turbine to the compressor, and an electric motor coupled the shaft; an exhaust particulate matter filter; a first exhaust passage coupling the exhaust manifold to a tailpipe via the turbine, the first exhaust passage including a first valve coupled upstream of an inlet of the filter; a waste-gate including a waste-gate valve coupled across the turbine; a second exhaust passage coupling the exhaust manifold to the tailpipe while bypassing the turbine, the second passage including a second valve coupled downstream of an outlet of the filter; a third exhaust passage coupling the inlet of the filter to the engine intake manifold, downstream of the compressor, the third passage including a third valve. The engine system may further include a controller with computer readable instructions stored on non-transitory memory for: responsive to each of operator torque demand and filter soot load, adjusting a position of each of the first, second, and third valve to vary a direction of flow through the filter between a first flow from the exhaust manifold to the inlet of the filter and then from the outlet of the filter to the tailpipe, and a second flow from the exhaust manifold to the outlet of the filter, and then from the inlet of the filter to the intake manifold.

The controller may include further instructions for wherein the adjusting includes, when operator torque demand is higher than a threshold demand and filter soot load is lower than a threshold load, or when operator torque demand is lower than the threshold demand and filter soot load is higher than the threshold load, actuating each of the first and second valves to a corresponding first position, and closing the third valve to provide the first flow through the filter; and when operator torque demand is higher than the threshold demand and filter soot load is higher than the threshold load, actuating each of the first and second valves to a corresponding second position, and opening the third valve to provide the second flow through the filter.

Figure 2A:
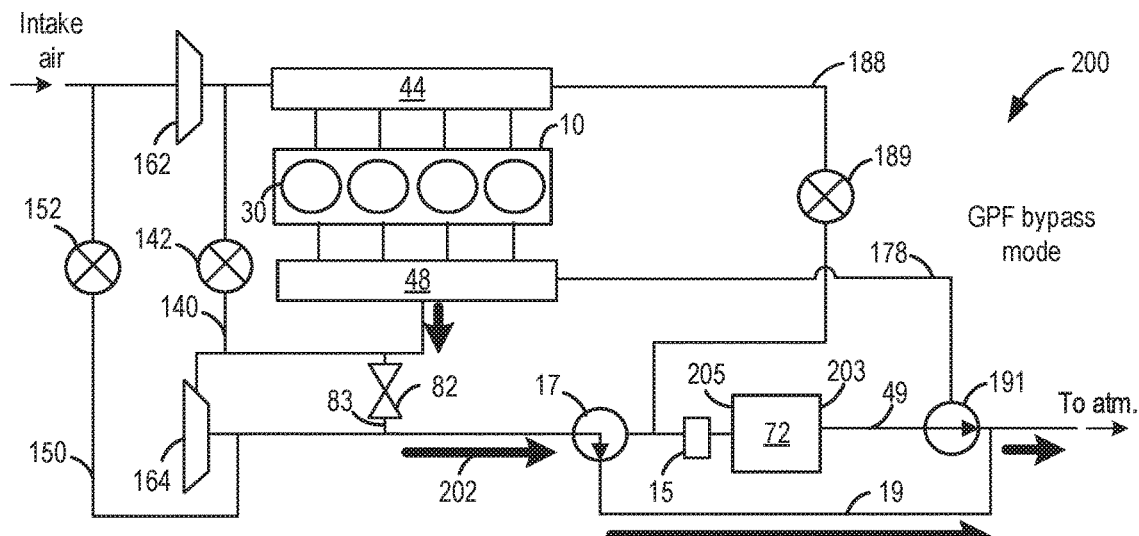
FIG. 2A shows operation of the emission control device of FIG. 1 in a GPF bypass mode.
Figure 2B:
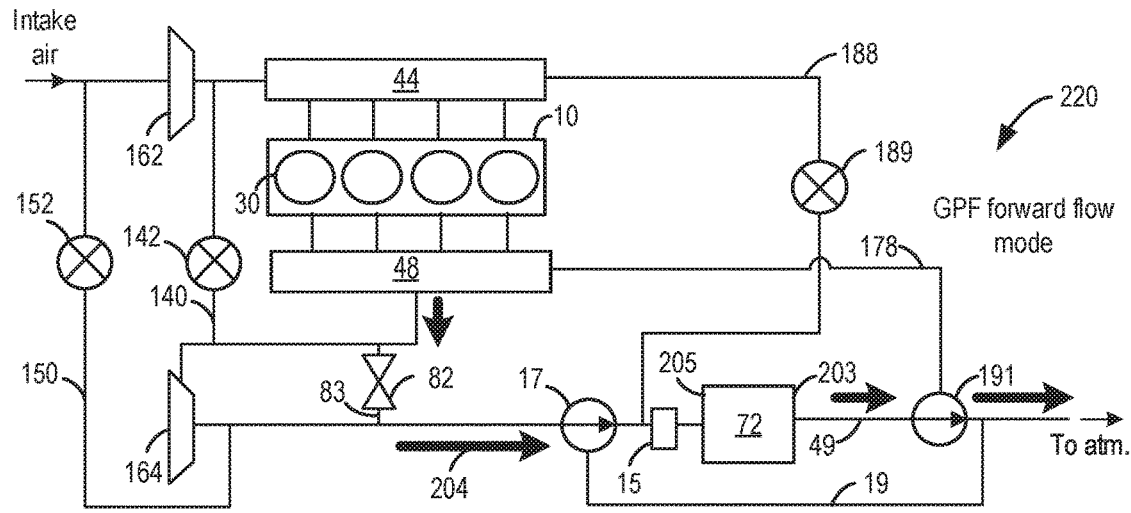
FIG. 2B shows operation of the emission control device of FIG. 1 in a GPF forward flow mode.
Figure 2C:
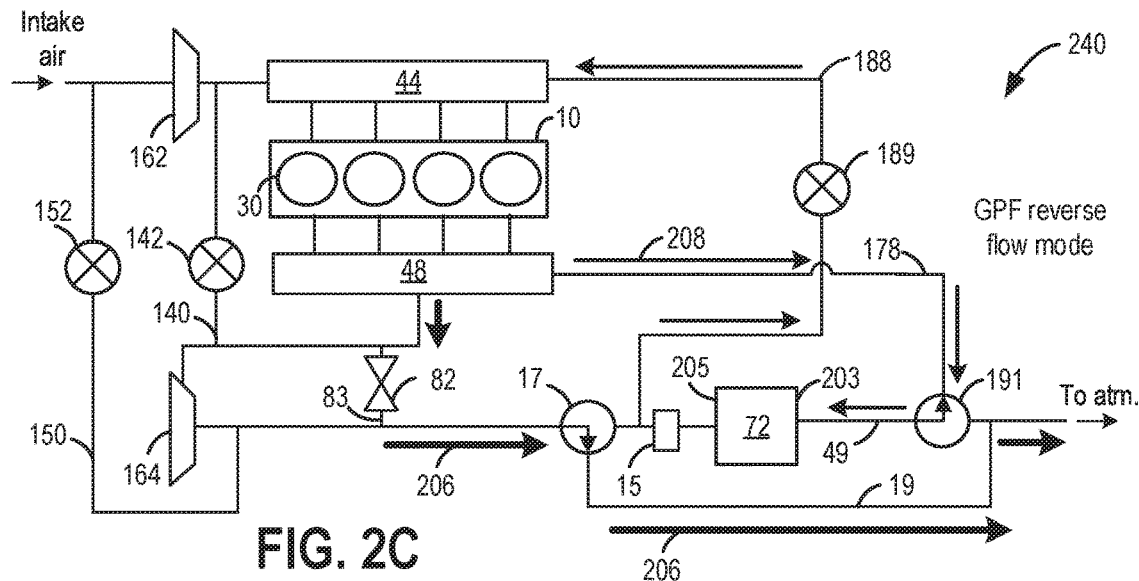
FIG. 2C shows operation of the emission control device of FIG. 1 in a GPF reverse flow mode.

Turning now to FIGS. 2A-2C, schematics 200, 220, and 240 include depictions of various combinations of the GPF valves of engine 10 introduced in FIG. 1. Components previously introduced in FIG. 1 are numbered similarly in FIGS. 2A-2C, and are not reintroduced. Some components of FIG. 1, including TWC 71, are not included in FIGS. 2A-2C for clarity. Engine 10 is shown with four cylinders 30, although it will be appreciated that engine 10 may include more or fewer cylinders. Engine 10 also includes intake manifold 44 which receives intake air from an upstream compressor 162 and directs the air charge to cylinders 30. Exhaust manifold 48 is configured to receive exhaust gas from cylinders 30, and direct the exhaust gas to turbine 164, which may be bypassed via control of waste-gate valve 82 disposed in waste-gate passage 83. LP-EGR passage 150 (with LP-EGR valve 152) and HP-EGR passage 140 (with HP-EGR valve 142) may be coupled between intake manifold 44 and exhaust manifold 48 at different locations with respect to the compressor. Pressure sensor 15 positioned upstream of GPF 72 may be used to determine an exhaust back-pressure at the particulate filter, and thereby infer the soot load of the GPF 72. GPF valves described earlier include GPF bypass valve 17, GPF flow direction selector valve 191, and GPF recirculation valve 189. FIG. 2A shows the GPF valves configured in a GPF bypass mode; FIG. 2B shows the GPF valves configured in a forward flow mode through the GPF; FIG. 2C shows the GPF valves configured in a reverse flow mode through the GPF.

Turning now to FIG. 2A, view 200 includes engine 10 with GPF valves configured to operate the exhaust system in a GPF bypass mode. In the GPF bypass mode, GPF bypass valve 17 is adjusted to a first position, which allows exhaust gas flow 202 from the exhaust passage, downstream of the turbine, to bypass the GPF 72 through bypass passage 19. In the depicted example, the first position of GPF bypass valve 17 directs the full exhaust gas flow 202 through bypass passage 19 and around GPF 72. In one example, GPF valve 17 is actuatable to the first position from a default position. However, it will be appreciated that in alternate embodiments, such as where GPF bypass valve 17 is a continuously variable valve, GPF valve 17 may be actuatable to a first degree of opening. In the GPF bypass mode, GPF flow direction selector valve 191 may be adjusted to a first position, which allows exhaust gas to flow in a forward direction to atmosphere, and does not allow exhaust gas to flow in a reverse direction along exhaust passage 49 to GPF 72 or into reverse flow passage 178. Further, in GPF bypass mode, GPF recirculation valve 189 may be adjusted to a first position, which does not allow any exhaust flow from the GPF 72 to enter the intake manifold 44 via recirculation passage 188. In this way, exhaust gas may flow from exhaust manifold 48, through turbine 164 and/or waste-gate passage 83, through the GPF bypass passage 19 to atmosphere.

Turning now to FIG. 2B, view 220 includes engine 10 with GPF valves configured to operate the exhaust system in a GPF forward flow mode. In GPF forward flow mode, GPF bypass valve 17 is adjusted to a second position, which directs forward flowing exhaust flow 204 through the GPF 72, and then to atmosphere without flowing through GPF bypass passage 19. In the depicted example, the second position of GPF bypass valve 17 directs the full forward flowing exhaust gas flow 204 to enter the GPF 72 at the upstream side 205 of GPF 72 (herein also referred to as inlet 205 of the GPF) and exit at the downstream side 203 (herein also referred to as outlet 203 of GPF 72). In GPF forward flow mode, GPF flow direction selector valve 191 may be adjusted to the first position, which allows exhaust gas to flow in a forward direction to atmosphere, and does not allow exhaust gas to flow in a reverse direction through the GPF 72 or into reverse flow passage 178. Further, in GPF forward flow mode, GPF recirculation valve 189 may be adjusted to the first position, which does not allow exhaust flow from the GPF 72 to enter the intake manifold via recirculation passage 188. In this way, exhaust gas may flow from exhaust manifold 48, through turbine 164 and/or waste-gate passage 83, through the GPF 72, and then to atmosphere.

Turning now to FIG. 2C, view 240 includes engine 10 with GPF valves configured to operate the exhaust system in a GPF reverse flow mode. In the GPF reverse flow mode, GPF bypass valve 17 is adjusted to a first position, which directs forward flowing exhaust gas 206 to bypass the GPF 72 through bypass passage 19 to atmosphere. Further, in the GPF reverse flow mode, the GPF flow direction selector valve 191 may be adjusted to a second position, which allows reverse flowing exhaust gas 208 to flow from exhaust manifold 48 through reverse flow passage 178 and then in a reverse direction through exhaust passage 49, where it then enters the downstream side 203 of GPF 72. Due to the reverse flowing exhaust gas 208 being closer to the source of exhaust pressure (that is, closer to the exhaust manifold) than the forward flowing exhaust flow 206, the reverse flowing exhaust gas 208 may be at a higher pressure than the forward flowing exhaust flow 206. A temperature and pressure of the forward flowing exhaust flow 206 is reduced when it flows through turbine 164.

In one example, purging soot using the reverse flow of exhaust gas includes flowing a first, smaller portion of exhaust gas from the exhaust manifold 48 into an outlet of the filter (e.g., downstream side 203 of GPF 72), and then from an inlet of the filter (e.g., upstream side 205 of GPF 72) to the engine intake manifold 44. At the same time, a second, portion, which comprising the remaining portion of the total exhaust gas, may flow from the exhaust manifold 48 to the tailpipe (e.g., atmosphere) while bypassing the filter. This is schematically represented by the thickness of the flow arrows, forward flowing exhaust gas 206 may comprise a larger proportion of the total exhaust gas than reverse flowing exhaust gas 208. In one example, reverse flowing exhaust gas 208 may comprise 10-20% of the total exhaust gas from the exhaust manifold 48, with the balance of total exhaust gas comprising forward flowing exhaust gas 206. As previously described, the second portion of exhaust gas may flow to the tailpipe via one of more of an exhaust turbine 164 and a waste-gate passage 83 bypassing the turbine 164. After exiting the GPF 72 on the upstream side 205 of the GPF 72, the reverse flowing exhaust gas 208 enters recirculation passage 188 and is directed through GPF recirculation valve 189, which may be adjusted to a second position. In this way, exhaust flow may pass from the exhaust manifold 48 through reverse flow passage 178 through GPF 72 (in a reverse direction), then through recirculation passage 188 to intake manifold 44, where it may join fresh intake air and be directed to cylinders 30 for combustion.

In some embodiments, engine operation may be further controlled responsive to purging conditions. Specifically, while purging soot from the filter, the amount of motor torque supplied to the exhaust turbine 164 based on operator torque demand may be adjusted. In one example, the motor torque may be increased as the operator torque demand increases while purging. In another example, while regenerating soot from the filter, the motor torque supplied to the exhaust turbine 164 may be adjusted based on soot load of the filter. In one non-limiting example, the motor torque may increase as the soot load on the filter increases.

In this way, a system for an engine is provided that includes an intake manifold and an exhaust manifold; a turbocharger having a turbine coupled to the exhaust manifold, a compressor coupled to the intake manifold, a shaft mechanically coupling the turbine to the compressor, and an electric motor coupled the shaft; an exhaust particulate matter filter; a first exhaust passage coupling the exhaust manifold to a tailpipe via the turbine, the first exhaust passage including a first valve coupled upstream of an inlet of the filter; a waste-gate including a waste-gate valve coupled across the turbine; a second exhaust passage coupling the exhaust manifold to the tailpipe while bypassing the turbine, the second passage including a second valve coupled downstream of an outlet of the filter; a third exhaust passage coupling the inlet of the filter to the engine intake manifold, downstream of the compressor, the third passage including a third valve; and a controller. The controller may be configured with computer readable instructions stored on non-transitory memory for: responsive to each of operator torque demand and filter soot load, adjusting a position of each of the first, second, and third valve to vary a direction of flow through the filter between a first flow from the exhaust manifold to the inlet of the filter and then from the outlet of the filter to the tailpipe, and a second flow from the exhaust manifold to the outlet of the filter, and then from the inlet of the filter to the intake manifold.

In some examples, the adjusting may include: when operator torque demand is higher than a threshold demand and filter soot load is lower than a threshold load, or when operator torque demand is lower than the threshold demand and filter soot load is higher than the threshold load, actuating each of the first and second valves to a corresponding first position, and closing the third valve to provide the first flow through the filter; and when operator torque demand is higher than the threshold demand and filter soot load is higher than the threshold load, actuating each of the first and second valves to a corresponding second position, and opening the third valve to provide the second flow through the filter. In still further examples, an exhaust gas recirculation (EGR) passage coupling the exhaust manifold, downstream of the filter to the engine intake manifold, upstream of the compressor, the EGR passage may include an EGR valve, wherein the controller includes further instructions for: when operating with the second flow through the filter, reducing an opening of the EGR valve as an opening of the third valve increases; and when operating with the second flow through the filter, reducing the opening of the EGR valve as an engine dilution demand decreases.

Turning now to FIG. 3, a table 300 summarizing the different combinations of GPF valve configurations illustrated in FIGS. 2A-2C is shown. As previously described, GPF valves may include a GPF bypass valve (e.g., GPF bypass valve 17 of FIGS. 1 and 2A-2C), a GPF flow direction selector valve (e.g., GPF flow direction selector valve 191 of FIGS. 1 and 2A-2C), and a GPF recirculation valve (e.g., GPF recirculation valve 189 of FIGS. 1 and 2A-2C). By selectively actuating each valve to a desired position, a quantity and direction of the flow of exhaust gas through the GPF may be controlled. As previously described, each of the aforementioned valves may be variable valves where they may be adjusted to a fully closed position (e.g., 0% opening), a fully open position (e.g., 100% opening), or any position there-between. For simplicity of discussion, the example modes below will reference a fully open or closed position, but it will be appreciated that the degree of opening of each of the GPF valves may vary without departing from the scope of this disclosure.

A GPF Bypass mode is shown at 302 (as also shown in FIG. 2A) and includes a GPF bypass valve (such as GPF bypass valve 17) actuated to a first position (e.g., position 1), where the first position of GPF bypass valve includes directing all forward flowing exhaust gas through a bypass passage (e.g., bypass passage 19 of FIGS. 1 and 2A-2C). In this way, forward flowing exhaust gas may be conveyed to atmosphere without passing through the GPF 72. GPF bypass mode may also include GPF flow direction selector valve actuated to a first position (e.g., position 1), where the first position of GPF flow direction selector valve includes directing all exhaust flow downstream toward the tailpipe and to atmosphere. In this way, by positioning the GPF flow direction selector valve in the first position, reverse flow of exhaust in an upstream toward the GPF or into a reverse flow passage (e.g., reverse flow passage 178) may be averted. GPF bypass mode may also include GPF recirculation valve actuated to a first position (such as a closed position), where the first position of GPF recirculation valve does not permit exhaust gas to enter an intake manifold (e.g., intake manifold 44 of FIGS. 1 and 2A-2C) via a recirculation passage (e.g. recirculation passage 188 of FIGS. 1 and 2A-2C). As a result, by actuating the valves to operate the exhaust system in the GPF bypass mode, a direction of exhaust flow may be provided that is from the engine through the GPF bypass and from then on to the tailpipe (e.g., atmosphere). Operating conditions that may be suitable for operating in GPF bypass mode include warm engine temperatures and low particulate emissions. In one non-limiting example, warm engine temperatures may include one or more of an engine coolant temperature being greater than 160° F. and an exhaust temperature being greater than 1200° F. Low particulate emissions may be determined based on mapped data stored in a memory of the vehicle controller, and may be based upon operating conditions such as engine speed and load, as well as engine temperature. In one example, the GPF bypass mode may be selected at warm idling conditions.

A GPF forward flow mode is shown at 304 (as also shown in FIG. 2B) and the mode includes GPF bypass valve actuated to a second position (e.g., position 2), where the second position of GPF bypass valve includes directing all forward flowing exhaust gas through the GPF. In this way, forward flowing exhaust gas may pass through the GPF before being conveyed to atmosphere. GPF forward flow mode may also include GPF flow direction selector valve actuated to the first (closed) position, where the first position of GPF flow direction selector valve includes directing all exhaust flow leaving the GPF to continue traveling downstream toward the tailpipe and to atmosphere. In this way, GPF flow direction selector valve in the first position may prevent exhaust flow from moving in a reverse direction upstream toward the GPF or into a reverse flow passage. GPF forward flow mode may also include GPF recirculation valve actuated to the first position, where the first position of GPF recirculation valve does not permit exhaust gas to enter the intake manifold via recirculation passage. As a result, in the GPF forward mode, a direction of exhaust flow is provided that is from the engine through the GPF in a forward direction and then on to the tailpipe (e.g., atmosphere). As previously described, forward flow through the particulate filter may be defined as an incoming gas flow approaching the particulate filter from the upstream side of the particulate filter (e.g., upstream side 205, as shown in FIGS. 2A-2C) and exiting the particulate filter on the downstream side of the particulate filter (e.g., downstream side 203, as shown in FIGS. 2A-2C). In particular, in the forward flow mode, exhaust enters the GPF at the inlet 205 and exits the GPF at outlet 203. Example operating conditions suitable for operating in GPF forward flow mode may include DFSO, peak power demand, enrichment conditions, cold start, and compression injection. In this way, the engine may operate in GPF forward flow mode during conditions when exhaust gas contains a high particulate content so that particulate matter may be loaded onto the GPF, thereby reducing tailpipe emissions. Further, the engine may operate in GPF forward flow mode during conditions when regeneration of the GPF is desired or possible (e.g., when passive regeneration is possible), so that exhaust at elevated temperatures may pass through the GPF in a forward direction, incinerating soot stored in the GPF, and carrying the gaseous products to the tailpipe. In other words, exhaust air is flowed from the exhaust manifold into the inlet of the filter, and then from the inlet of the filter to the tailpipe in order to regenerate soot and flow the regenerated soot to the tailpipe. In some examples, operating in the first, loading mode may occur when operator torque demand is higher than a threshold demand and filter soot load is lower than a threshold load. In other examples, operating in a third, regenerating mode may occur when operator torque demand is lower than a threshold demand and filter soot load is higher than a threshold load.

A GPF reverse flow mode is shown at 306 (as also shown in FIG. 2C) and the mode includes GPF bypass valve actuated to the first position, where the first position of GPF bypass valve includes directing all forward flowing exhaust gas through the GPF bypass. In this way, forward flowing exhaust gas may pass through the GPF bypass, rather than the GPF, before being conveyed to atmosphere. GPF reverse flow mode may also include GPF flow direction selector valve actuated to a second position (e.g., position 2), where the second position of GPF flow direction selector valve includes allowing an exhaust flow from reverse flow passage to pass through GPF flow direction selector valve in a reverse direction (e.g., upstream) toward the GPF rather than downstream to the tailpipe. In particular, in the reverse flow mode, exhaust enters the GPF at the outlet 203 and exits the GPF at inlet 205. GPF reverse flow mode may also include GPF recirculation valve actuated to a second position (e.g., position 2), where the second (open) position of GPF recirculation valve permits exhaust gas to enter the intake manifold via recirculation passage (e.g., recirculation passage 188 of FIGS. 1 and 2A-2C). As a result, by actuating the valves to operate the exhaust system in a GPF reverse mode, a direction of exhaust flow may be provided that is from the engine through the GPF in a reverse direction and then to the intake manifold of the engine.

As previously described, reverse flow through the particulate filter may be defined as an incoming gas flow approaching the particulate filter from the downstream side of the particulate filter and exiting the particulate filter on the upstream side of the particulate filter. Operating conditions suitable for operating in GPF reverse flow mode may include warm engine temperatures and low particulate emissions. In one non-limiting example, warm engine temperatures may include an engine coolant temperature greater than 160° F. and an exhaust temperature greater than 1200° F. Low particulate emissions may be determined based on mapped data stored in a memory of the vehicle controller, and may be based upon operating conditions such as engine speed and load, as well as engine temperature. Further, operating conditions suitable for operating in GPF reverse flow mode may include low-to-mid engine speeds and loads, where a purge of the GPF is desired or possible. Specifically, purging of the GPF may be desired when a soot load of the GPF is above a lower threshold (as may be indicated by the output of a pressure sensor proximate the GPF being above a pressure threshold) and when engine operating conditions allow for recirculation of exhaust gas from the GPF to the intake manifold of the engine for combusting. In this way, GPF purging may be performed during conditions where EGR is desired to improve engine performance and reduce filter soot levels. In some examples, the engine may be operated in the second mode when operator torque demand is higher than a threshold demand and filter soot load is higher than a threshold soot load.

In this way, operating the engine in the first mode (e.g., loading) or the third mode (e.g., regeneration) includes actuating a first valve (e.g., GPF bypass valve 17), coupling an exhaust manifold to a tailpipe upstream of the filter, to a first position of the first valve and actuating a second valve (e.g., GPF flow direction selector valve 191), coupling the exhaust manifold to the tailpipe downstream of the filter, to a first position of the second valve, and wherein operating in the second mode (e.g., purging) includes actuating the first valve to a second position of the first valve and actuating the second valve to a second position of the second valve. Further, operating in the second mode further includes opening a third valve (e.g., GPF recirculation valve 189) in a recirculation passage (e.g., recirculation passage 188) coupling an inlet of the filter to the engine intake, downstream of an intake throttle (e.g., throttle 62).

Figure 4:
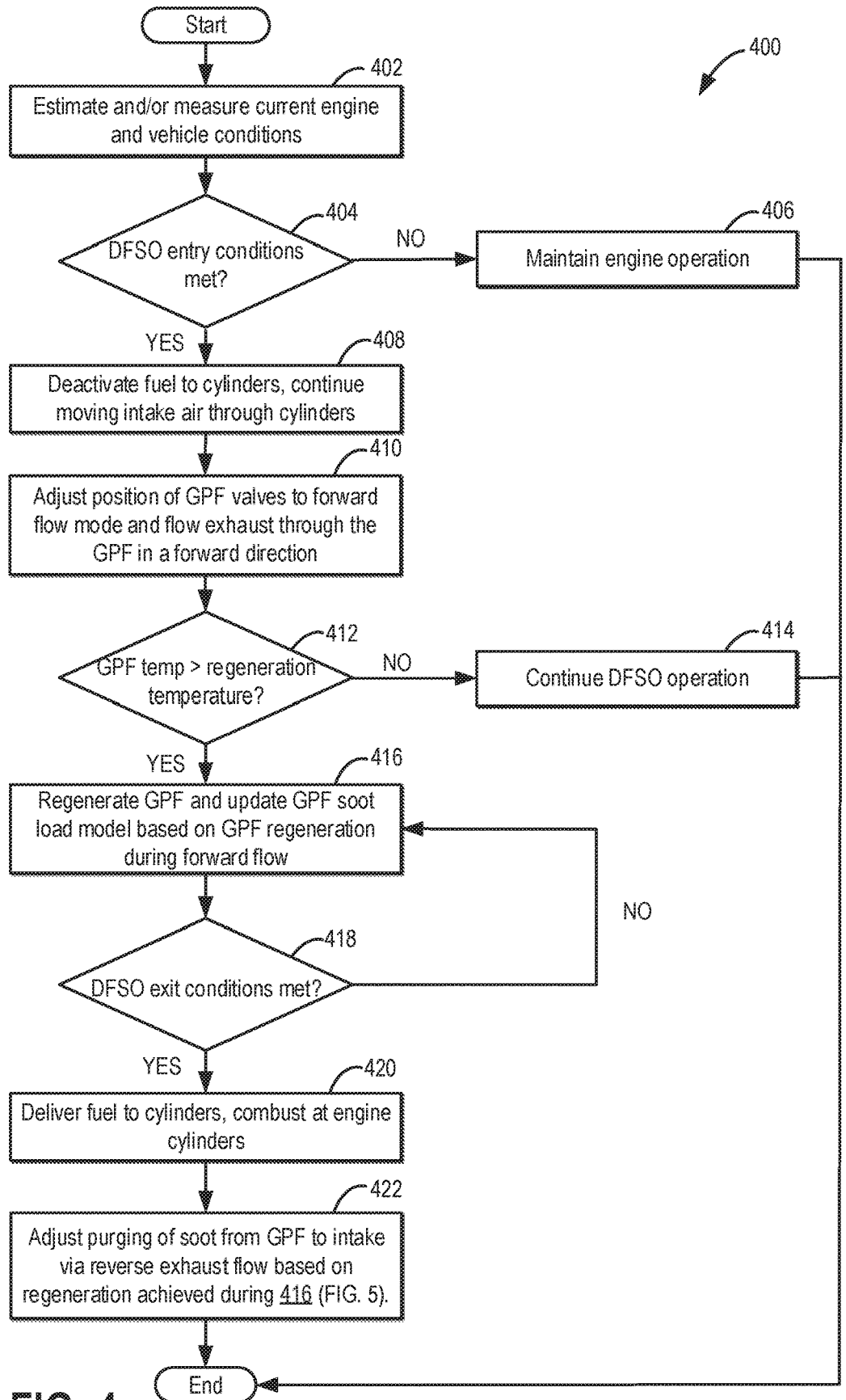
FIG. 4 shows a high-level flow chart of an example method for coordinating regeneration of a GPF during DFSO with purging of the GPF during fueled engine operation.

Turning now to FIG. 4, an example method 400 for coordinating GPF regeneration with GPF is shown. The method enables soot load to be reduced without the purging being adversely affected by transients. Instructions for carrying out method 400 and the rest of the methods included herein may be executed by a controller (e.g., controller 12 of FIG. 1) based on instructions stored on a memory of the controller and in conjunction with signals received from sensors of the vehicle (e.g., vehicle 100 of FIG. 1), such as the sensors described above with reference to FIG. 1. The controller may employ engine actuators of the engine system to adjust engine operation, according to the methods described below.

Routine 400 starts at 402, where the routine includes estimating and/or measuring current engine and vehicle operating conditions. Current engine and vehicle conditions may include, but are not limited to, an air-fuel ratio (e.g., an air-fuel ratio of combusted exhaust gases exiting engine cylinders), a position of the GPF bypass valve (e.g., GPF bypass valve 17 shown in FIGS. 1 and 2A-2C), a position of the GPF flow direction selector valve (e.g., GPF flow direction selector valve 191 of FIGS. 1 and 2A-2C), and a position of a GPF recirculation valve (GPF recirculation valve 189 of FIGS. 1 and 2A-2C). Current engine and vehicle conditions may further include a duration since a last particulate filter regeneration event, engine speed and engine load, boost level, engine coolant temperature, operator torque demand as inferred from a degree of actuation of (or position of) an accelerator pedal (e.g., input device 130 of FIG. 1), and an exhaust temperature and pressure proximate a particulate filter (e.g., GPF 72 of FIGS. 1 and 2A-2C). Current vehicle operating conditions may also include a current particulate filter soot load, which may be modeled based on the level of feed-gas soot and regeneration achieved during a previous DFSO regeneration operation. The feed-gas soot level may be modeled based on one or more of the engine coolant temperature, torque, the air-fuel ratio, and the engine speed.

In one example, an engine coolant temperature may be indicated by the output of an engine coolant temperature sensor (e.g., engine coolant temperature sensor 112 of FIG. 1), where an engine coolant temperature above an engine temperature threshold may indicate that the engine is warm, and not in a cold-start condition. An exhaust temperature may be indicated by the output of an exhaust temperature sensor (e.g., exhaust temperature sensor 16 of FIG. 1). An exhaust gas particulate matter content may be determined using a mapping table stored in a memory of the controller based on engine operating conditions such as engine speed, engine load, and an air-fuel ratio. Indications of engine speed may be received from the output of a Hall effect sensor (e.g., Hall effect sensor 118 of FIG. 1). Engine load may be indicated by one or more of an engine speed, and a degree of actuation of an accelerator pedal. An air-fuel ratio may be determined based on the output of an exhaust gas sensor (e.g., exhaust gas sensor 126 of FIG. 1).

The controller 12 may receive the output of a pressure sensor (e.g., pressure sensor 15 of FIGS. 1-2) at the GPF, which may indicate a degree of soot loading on the particulate filter that will be described further below. An empirical model may be used to estimate current particulate filter soot loading and may be used as a basis for controlling regeneration of the GPF. In one example, GPF soot load modeling updates the GPF soot load under varied operating conditions by adding a soot load estimated by a model (stored in memory of the controller), to the last measured soot load value. The soot model may include a level of engine feed-gas soot, which may be determined as a function of one or more of an engine speed, an engine coolant temperature, an air-fuel ratio, and torque.

At 404, the routine includes determining whether DFSO entry conditions have been met. In one example, DFSO entry conditions may be based on a plurality vehicle and engine operating conditions. In particular, the routine may rely on a combination of one or more of vehicle speed, vehicle acceleration, engine speed, engine load, throttle position, pedal position, transmission gear position, and various other parameters to determine whether DFSO entry conditions have been met at 404. In one example, DFSO entry conditions may be confirmed responsive to engine speed below a threshold speed, engine load below a threshold load, or an accelerator pedal position indicative of a drop in torque demand (e.g., a tip-out event).

If DFSO entry conditions are not met at 404, the routine proceeds to 408, where the routine includes maintaining engine operation. In one example, maintaining engine operation may include continuing to deliver fuel to cylinders of the engine and combusting the fuel in order to meet torque demand.

If DFSO entry conditions are met at 404, the routine proceeds to 406, where the routine includes disabling cylinder fueling to operating the engine in a DFSO mode. Specifically, the engine is operated without fuel injection while the engine continues to rotate and move intake air through the cylinders of the engine and emission control device. During this time, the oxygen loading of the catalyst (e.g., TWC 71 of FIG. 1) in the emission control device (e.g., ECD 70 of FIG. 1) is monitored since the catalyst can become loaded with oxygen from the fresh air passing through the cylinders in the absence of cylinder combustion.

At 410, the routine includes adjusting the position of GPF valves to operate the exhaust system in a forward flow mode and flowing exhaust through the GPF in a forward direction. As used herein, the forward flow direction refers to exhaust flow from the exhaust manifold, through or bypassing the turbine into an inlet 205 of the GPF, and then from the outlet 203 of the GPF to the tailpipe. As described in reference to FIG. 2B, forward flow mode includes adjusting GPF bypass valve to the second position, which directs forward flowing exhaust through the PF (in a first direction from the inlet to the outlet of the PF) and then to atmosphere. In one example, the second position of the GPF bypass valve directs the full exhaust gas flow received from the exhaust manifold in the exhaust passage through the GPF. In GPF forward flow mode, the GPF flow direction selector valve may be adjusted to a first position, which allows exhaust gas to flow in a forward direction to atmosphere, and does not allow exhaust gas to flow in a reverse direction through the GPF or into a reverse flow passage (e.g., reverse flow passage 178 of FIGS. 1 and 2A-2C). Further, in GPF forward flow mode, the GPF recirculation valve may be adjusted to the first position, which does not allow exhaust flow from the GPF to enter the intake manifold (e.g., intake manifold 44 of FIGS. 1 and 2A-2C) via a recirculation passage (e.g., recirculation passage 188 of FIGS. 1 and 2A-2C). In this way, exhaust gas may flow from an exhaust manifold (e.g., exhaust manifold 48 of FIGS. 1 and 2A-2C), through a turbine (e.g., turbine 164 of FIGS. 1 and 2A-2C) and/or waste-gate passage (e.g., waste-gate passage 83 of FIGS. 1 and 2A-2C), through the GPF, and then to atmosphere.

With the GPF valves configured to operate the exhaust system in the forward flow mode, the air moving through the engine and emission control device during DFSO may result in regeneration of the particulate filter if the exhaust temperature is sufficiently hot and resulting temperatures at the GPF exceed a regeneration temperature. At 412, the routine includes determining whether the GPF temperature (or the exhaust temperature at the GPF) is greater than the regeneration temperature. In one non-limiting example, the regeneration temperature at the particulate filter may be 450° C. or greater. If GPF temperatures do not exceed the regeneration temperature, the routine proceeds to 414, where the routine includes continuing DFSO operation as long as DFSO conditions are met.

If GPF temperatures exceed the regeneration temperature at 412, the routine proceeds to 416, where the GPF is passively regenerated (e.g., where at least some of the carbon particles accumulated in the particulate filter may incinerate, forming gaseous products that may be expelled to atmosphere along the tailpipe as exhaust). That is, as hot exhaust flows through the GPF, soot may be incinerated in situ. Additionally, the controller may update a GPF soot load, such as a soot load model stored in a memory of the controller, based on the passive GPF regeneration achieved during forward flow. The GPF soot load model may be updated as a function of each of the exhaust temperature, the duration of exhaust flow through the GPF, and a flow rate of exhaust through the GPF. Updating the GPF soot load model may include decreasing the estimated amount of soot stored in the GPF based on a duration of the regeneration operation. In one example, this may include further decreasing the estimated soot load of the GPF as the duration (e.g., elapsed time) of regeneration increases. In other examples, updating the GPF soot load model may include further decreasing the estimated soot load of the GPF load as the GPF temperature (or exhaust temperature) during regeneration increases above a threshold regeneration temperature, and reducing the estimated soot load as the exhaust flow rate through the GPF increases. The soot load model may also be adjusted based on an indication of exhaust backpressure. In one example, exhaust backpressure may be measured using a pressure sensor positioned upstream of the GPF, such as pressure sensor 15 of FIGS. 1 and 2A-2C. In other examples, a pressure gradient across the GPF using one or more sensors or a differential pressure sensor, may be used to determine an exhaust backpressure (and infer a level of soot storage) at the GPF. For example, the output of the pressure sensor may decrease following a regeneration of the GPF as the decreased soot load in the GPF may result in a lower exhaust backpressure upstream of the GPF.

At 418, the routine includes determining whether DFSO exit conditions have been met. In one example, DFSO exit conditions may be confirmed when the driver demand, as indicated by a pedal position sensor coupled to an accelerator pedal (e.g., pedal position sensor 134 and input device 130 of FIG. 1), increases above a threshold (such as responsive to a tip-in event). In other examples, DFSO exit conditions may be met if engine load is greater than a threshold, as may occur when propelling the vehicle up a hill or towing a load. Various other engine and vehicle operating parameters may be monitored which may indicate an end of the DFSO event. For example, the routine may monitor a temperature of the particulate filter to ensure the temperature of the particulate filter does not exceed an upper threshold, the upper threshold greater than the regeneration temperature, the upper threshold reflective of a temperature above which particulate filter thermal degradation can occur. In some examples, DFSO may end responsive to the particulate filter temperature reaching the upper threshold. This may include the DFSO ending before the GPF has been fully regenerated. In this way, the GPF may be regenerated to whatever extent possible opportunistically during a DFSO. If DFSO exit conditions are not met, the routine returns to 416 to continue regenerating the GPF and update the GPF soot load model, as previously described.

If DFSO exit conditions are met, the routine continues to 420, where the routine includes reactivating fuel delivery to cylinders of the engine and combusting fuel in order to meet the driver torque demand.

Figure 5:
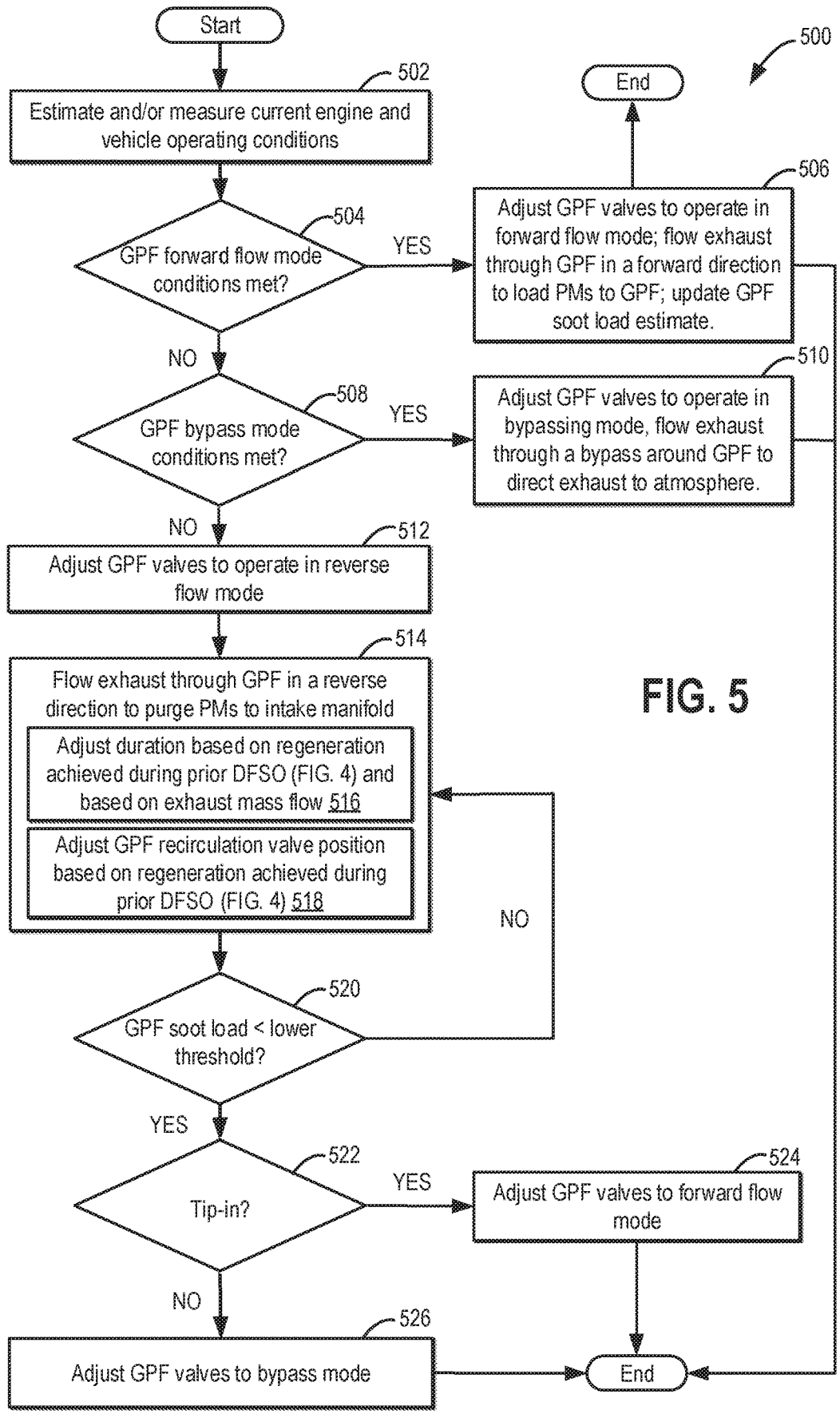
FIG. 5 shows a high-level flow chart of an example method for adjusting a plurality of GPF valves responsive to engine operating conditions to operate the GPF in one of the plurality of modes of FIGS. 2A-2C.

At 422, the routine includes adjusting purging of soot from the GPF to the intake manifold via reverse exhaust flow through the GPF, as described further in FIG. 5, based on the regeneration achieved at 416. Inventors have recognized that passive regeneration using forward exhaust flow through the GPF during DFSO conditions may enable a portion of the GPF soot load to be opportunistically reduced. However, since DFSO conditions can be infrequent, and further the DFSO can be exited responsive to torque transients, additional soot load reduction can be achieved by purging the GPF using reverse exhaust flow through the GPF during engine fueling conditions. Therein, soot may be purged to the intake manifold allowing for opportunistic soot reduction. Since the engine operated fueled over a longer portion of a drive cycle, a larger portion of the soot can be opportunistically purged to the intake. By coordinating the purging of GPF soot to the intake with passive regeneration of GPF during DFSO conditions, the need for active regeneration of the GPF is reduced, providing fuel economy benefits.

In one example, adjusting the purging of the GPF based on the prior passive regeneration of the GPF may include adjusting the position of GPF valves to a reverse flow mode and flowing exhaust through the GPF in a reverse direction (from the outlet to the inlet of the GPF) in order to purge any remaining GPF soot load to the intake manifold of the engine, where it may be combusted. In this way, purging uses reverse flowing exhaust gas (e.g., flowing exhaust gas from the exhaust manifold into a first passage coupled to filter, the first passage coupled to the downstream outlet of the particulate filter), and regenerating uses forward flowing exhaust gas (e.g., flowing exhaust gas from the exhaust manifold into a second passage, different from the first passage coupled to the upstream inlet of the particulate filter). In some embodiments, the first passage and the second passage are distinct passages that may overlap at the particulate filter. In one embodiment, the first passage may also be fluidically coupled to an exhaust gas recirculation passage (e.g., HP-EGR system of FIG. 1) recirculating exhaust gas from the exhaust manifold to the engine intake, downstream of the compressor 162. In other examples, the first passage may be fluidically coupled to an exhaust gas recirculation passage (e.g., LP-EGR system of FIG. 1) recirculating exhaust gas from the exhaust manifold to the engine intake, upstream of the compressor 162. The routine then ends.

Turning now to FIG. 5, a flow chart of an example routine 500 for adjusting a plurality of GPF valves responsive to engine operating conditions, including flowing exhaust through a GPF in reverse to purge particulate matter from the GPF to an intake manifold of an engine is shown.

Routine 500 begins at 502 where the routine includes estimating and/or measuring current engine and vehicle operating conditions. Current engine and vehicle operating conditions may include, for example, operator torque demand, vehicle speed, an air-fuel ratio (e.g., an air-fuel ratio of combusted exhaust gases exiting engine cylinders), a position of the particulate filter bypass valve, a position of the GPF flow direction selector valve, and a position of a GPF recirculation valve, a duration since the last particulate filter regeneration, an engine speed and engine load, an engine coolant temperature, a degree of actuation of (or position of) an accelerator pedal, and an exhaust temperature and pressure proximate the particulate filter. Current engine and vehicle operating conditions may also include a current particulate filter soot load, which may be modeled based on the level of feed-gas soot and regeneration achieved during a previous DFSO regeneration operation, such as the DFSO regeneration described in FIG. 4. The feed-gas soot level may be modeled based on one or more of the engine coolant temperature, torque, the air-fuel ratio, and the engine speed.

At 504, the routine includes determining whether GPF forward flow conditions have been met. In one example, GPF forward flow conditions may be met when the engine is operating in DFSO mode, where passive regeneration of the GPF may or may not be occurring during the DFSO. For example, GPF forward flow conditions may be met when the operator torque demand is below a threshold and where the engine can be operated unfueled.

Alternatively, GPF forward flow conditions may be met during conditions when particulate matter emissions are elevated and the GPF needs to be loaded. For example, GPF loading using forward flow may be enabled during a peak power condition, where a driver demanded torque is above a threshold load. During peak power conditions, the air-fuel ratio may (or may not) be enriched and the resulting exhaust gas may contain an elevated level of particulate matters (e.g., above a threshold level of particulate matter). At this time, the exhaust gas may be passed through the GPF in order to reduce exhaust particulate emissions. Other operating conditions where GPF forward flow can be enabled include an engine cold-start condition where a catalyst light-off temperature is not met and the catalyst remains inactivated. As a result, cold-start emissions may not be treatable and instead, the particulate matter is trapped at the GPF. Yet another example of a condition where GPF forward flow can be enabled includes engine fueling with compression injection where at least a portion of the fuel is direct injected in a compression stroke of an engine cycle. For example, based on engine operating conditions, a cylinder fueling profile may be determined including a ratio of fuel to be port injected versus direct injected, and further including a ratio of direct injected fuel to be delivered during an intake stroke versus a compression stroke. Compression stroke direct injection may be used to improve the atomization of fuel, such as when the fuel has a lower octane rating or when the engine temperature is low. However, compression injection is also prone to particulate matter generation. Thus by enabling GPF forward flow during compression injection conditions, the generated PMs can be trapped at the GPF for later expulsion.

If GPF forward flow conditions are met, then the routine continues to 506, where the routine includes adjusting the GPF valves to operate the exhaust system in a forward flow mode and thereafter flowing exhaust through the GPF in a forward direction to load particulate matter onto the GPF or to regenerate the GPF, responsive to operating conditions. As described earlier in reference to FIG. 2B, this includes adjusting the GPF bypass valve to a second position, which directs forward flowing exhaust flow through the GPF and then to atmosphere. Additionally, GPF flow direction selector valve may be adjusted to a first position, which allows exhaust gas to flow in a forward direction to atmosphere, and does not allow exhaust gas to flow in a reverse direction through the GPF or into the reverse flow passage. Further, in GPF forward flow mode, GPF recirculation valve may be adjusted to the first position, which does not allow exhaust flow from the GPF to enter the intake manifold via the recirculation passage. In this way, exhaust gas may flow from the exhaust manifold, through a turbine and/or wastegate passage, through the GPF in a forward direction (from the inlet to the outlet), and then to atmosphere. The routine then ends.

If GPF forward flow conditions are not met, the routine proceeds to 508, where the routine includes determining whether GPF bypass conditions have been met. In one example, GPF bypass conditions may be met when neither GPF loading nor GPF unloading is desired. For example, during conditions when the GPF load is less than a threshold load, neither forward flow through the GPF (to enable passive regeneration) not reverse flow through the GPF (to enable purging to the intake) may be required. As another example, during conditions when the engine is warm idling and not generating soot, neither GPF loading nor GPF unloading is required. In one example, GPF bypass flow conditions may be met when engine temperature is above a threshold temperature, indicative of a warm engine conditions. In some examples, GPF bypass conditions may also include an engine coolant temperature above a threshold, and an exhaust temperature above a threshold. Further GPF bypass conditions may include a particulate matter content of exhaust gas below a threshold. In this way, when engine exhaust is low in particulate matter content, exhaust gas may bypass the particulate filter and may still meet emissions standards.

If GPF bypass conditions have been met, then the routine proceeds to 510, where the routine includes adjusting GPF valves to operate the exhaust system in a GPF bypass mode and flow exhaust to the tailpipe through a bypass around the GPF (without flowing exhaust through the GPF) and then direct exhaust to atmosphere. As previously described with reference to FIG. 2A, in the GPF bypass mode, the GPF bypass valve is adjusted to a first position, which allows forward flowing exhaust gas flow to bypass the GPF through the bypass passage rather than passing through the GPF.

Further, the GPF flow direction selector valve may be adjusted to a first position which allows exhaust gas to flow in a forward direction to atmosphere, and does not allow exhaust gas to flow in a reverse direction through the GPF or into the reverse flow passage. Further, the GPF recirculation valve may be adjusted to a first position, which does not allow any exhaust flow from the PF to enter the intake manifold via the recirculation passage. In this way, exhaust gas may flow from the exhaust manifold, through turbine and/or waste-gate passage, through the GPF bypass passage to atmosphere. The routine then ends.

If GPF bypass conditions have not been met, then the controller may infer that GPF reverse flow conditions have been met. In one example, the GPF reverse flow mode is a default mode of the exhaust system and is used to slowly purge a portion of the GPF soot load over a prolonged duration of the drive cycle, while the engine is operating fueled. Responsive to GPF reverse flow conditions being inferred, the routine proceeds to 512, where the routine includes adjusting GPF valves to operate the exhaust system in a reverse flow mode. As previously described with reference to FIG. 2C, GPF reverse flow mode conditions may include warm engine temperatures and low particulate emissions. In one non-limiting example, warm engine temperatures may include an engine coolant temperature greater than 160° F. and an exhaust temperature greater than 1200° F. Low particulate emissions may be determined based on mapped data stored in a memory of the vehicle controller, and may be based upon operating conditions such as engine speed and load, as well as engine temperature. Further, operating conditions suitable for operating in GPF reverse flow mode may include low-to-mid engine speeds and loads, where a purge of the GPF is desired. Specifically, purging of the GPF may be desired when a soot load of the GPF is above a lower threshold (as may be indicated by a pressure sensor proximate the GPF) and when engine operating conditions allow for recirculation of exhaust gas from the GPF to the intake manifold of the engine for combusting.

In the GPF reverse flow mode, the GPF bypass valve is adjusted to a first position, which directs a first, forward-flowing exhaust flow from the engine to bypass the GPF through a bypass passage disposed around the GPF to atmosphere. Further, the GPF flow direction selector valve may be adjusted to a second position, which directs a second, reverse-flowing exhaust flow from the exhaust manifold through the reverse flow passage and then in a reverse direction through the GPF (from the outlet to the inlet). After exiting the GPF on the upstream/inlet side of the GPF, the exhaust flow enters the recirculation passage and is directed through GPF recirculation valve, which may be adjusted to a second position. In this way, exhaust flow may pass from the exhaust manifold through reverse flow passage, through GPF (in a reverse direction), then through the recirculation passage to the intake manifold, where it may join fresh intake air and be directed to engine cylinders for combustion. GPF reverse flow mode is shown in FIG. 2C.

The routine then proceeds to 514, where the routine includes flowing exhaust through the GPF in a reverse direction in order to purge particulate matter from the GPF to the intake manifold of the engine. This may be referred to as purging, wherein the reverse flow of exhaust gas through the GPF may free and carry particulate matter from the GPF out the inlet of the GPF to the intake manifold of the engine for combusting. In some examples, the reverse exhaust flow from the GPF may join one of the existing EGR systems, or it may remain separate. In some embodiments, the routine may include adjusting EGR flow via one or more EGR passages responsive to the purging of GPF soot to the engine intake. For example, responsive to GPF purging, LP-EGR flow and/or HP-EGR flow may be reduced by reducing an opening of the corresponding EGR valves. In addition, a ratio of HP-EGR flow to LP-EGR flow may be varied responsive to the purging. For example, since the purged GPF load is received downstream of the compressor, when the GPF recirculation valve is opening, an opening of an HP-EGR valve may be reduced while an opening of the LP-EGR valve is adjusted (e.g., increased) to maintain a net amount of exhaust recirculation (which now includes exhaust recirculated via the LP and HP EGR passages and exhaust received in the intake via the GPF recirculation passage).

At 516, the routine includes adjusting a duration of the reverse flow (e.g., GPF purging) based on the regeneration achieved during a prior DFSO event (such as the DFSO regeneration of FIG. 4). In one example, if 80% GPF regeneration was achieved during the previous DFSO, reverse flow purging may be performed to purge the remaining 20% of particulate matter load from the GPF over the drive cycle. Alternatively, if 20% GPF regeneration was achieved during the previous DFSO, reverse flow purging may be performed to purge the remaining 80% of the particulate matter load from the GPF. In this way, purging may be performed for a longer duration responsive to a lower level of regeneration achieved during the previous DFSO. Additionally, the duration of the reverse flow may be based on an exhaust mass flow rate. In one example, exhaust may be flowed through the GPF in a reverse direction until sufficient exhaust mass (or a threshold exhaust mass or volume) has flowed through the GPF to achieve a desired reduction in particulate matter of the GPF. In one non-limiting example, the duration may end after flowing ten times the displacement volume of the GPF to the intake manifold.

Further, the controller may adjust an EGR flow to the engine intake manifold based on the GPF recirculation flow. For example, while the GPF recirculation flow is received downstream of the compressor, the controller may reduce HP-EGR flow. As another example, the controller may adjust a ratio of HP-EGR to LP-EGR delivered to the engine based on the GPF recirculation flow, such as by reducing HP-EGR flow and increasing LP-EGR flow. Since the GPF recirculation valve recirculates exhaust gas back into the intake manifold of the engine, downstream of the compressor, the tolerance of the engine combustion process to the recirculated exhaust gas matches its tolerance to a traditional exhaust gas recirculation (EGR) system. The combined exhaust flow (from the combination of the GPF recirculation flow and the EGR flow) may therefore not exceed the EGR tolerance of the engine, for an engine with separate GPF recirculation and EGR valves. During a large torque transient, the recirculated gas needs to be blended out to allow for more fresh air to meet the torque demand. Therefore, during a tip-in, the EGR valve may be closed to allow more fresh air to be received in the intake manifold. Likewise, during a tip-out to low-mid loads, the EGR valve may be opened to increase engine dilution. The EGR valve may be opened until engine idling is reached, and then the EGR valve may be closed to reduce EGR flow due to the lower EGR tolerance of the engine at idle conditions.

The inventors have recognized that by using distinct EGR and GPF recirculation passages/valves, it may be easier to coordinate filter regeneration requirements with changing EGR flow requirements. In particular, the higher tolerance of the engine to purge flow from the GPF, relative to EGR flow at engine idling conditions, enables the low flow setting of the GPF recirculation valve to be provided anytime reverse flow conditions are met. Furthermore, manifold vacuum generation at engine idling conditions is not affected by the low purge flow setting. Consequently, the filter regeneration is not affected by sudden and significant changes in EGR demand.

At 518, the routine includes adjusting the position of the GPF recirculation valve based on the regeneration achieved during the prior DFSO event (such as the DFSO regeneration of FIG. 4). In this way, the controller may send a control signal to the GPF recirculation valve in order to increase the opening of the GPF recirculation valve so as to increase the amount of reverse exhaust flow entering the intake manifold from the GPF, thereby increasing an amount of purging of particulate matter from the GPF if the previous DFSO regeneration did not fully regenerate the GPF. In one example, this may occur when the previous DFSO may have ended responsive to an increase in torque demand before the GPF was fully regenerated (as may be indicated by an exhaust backpressure upstream of the GPF not reaching a lower threshold correlated with a fully regenerated, "clean" GPF). In other examples, full regeneration of the GPF during DFSO may not occur when a DFSO is prematurely aborted responsive to a GPF temperature increasing above an upper threshold that may cause degradation of the GPF.

Alternatively, the controller may send a control signal to the GPF recirculation valve in order to decrease the opening of the GPF recirculation valve to decrease the amount of reverse exhaust flow entering the intake manifold from the GPF, thereby decreasing the amount of purging of particulate matter from the GPF. In one example, this may occur when the previous DFSO may have been for a duration that allowed full regeneration of the GPF (as may be indicated by an exhaust backpressure upstream of the GPF reaching a lower threshold correlated with a fully regenerated, "clean" GPF). In one example, the controller may send a control signal to fully close the GPF recirculation valve in order to reduce reverse flow through and purging of the GPF if the previous DFSO fully regenerated the GPF and purging would not achieve further exhaust backpressure reduction.

The routine then proceeds to 520, where the routine includes determining whether the GPF soot load is lower than a lower threshold. The lower threshold may be based upon a fully regenerated GPF, where sufficient reduction in the soot load retained in the GPF has been achieved to reduce the exhaust backpressure at the GPF to a lower threshold pressure. If the GPF soot load has not reached the lower soot load threshold, the routine returns to 514, where the routine includes continuing to flow exhaust through the GPF in a reverse direction, while the engine continues to operate fueled, to purge particulate matter from the GPF to the intake manifold of the engine for combustion.

If the GPF soot load is lower than the lower threshold, the routine proceeds to 522, where the routine includes determining whether there has been a tip-in. A tip-in may be indicated by an actuation of the accelerator pedal and conveys an operator request to increase the torque delivered by the engine. If a tip-in request has been received, the routine continues to 524, where the routine includes adjusting the GPF valves to a forward flow mode so as to start loading the GPF. As previously described, adjusting the GPF valves to a forward flow mode includes adjusting the GPF bypass valve to a second position, which directs forward flowing exhaust flow through the GPF and not through GPF bypass, then to atmosphere. In GPF forward flow mode, GPF flow direction selector valve may be adjusted to a first position, which allows exhaust gas to flow in a forward direction to atmosphere, and does not allow exhaust gas to flow in a reverse direction through the GPF or into the reverse flow passage. Further, in GPF forward flow mode, the GPF recirculation valve may be adjusted to the first position, which does not allow exhaust flow from the GPF to enter the intake manifold via the recirculation passage. In this way, exhaust gas may flow from exhaust manifold, through turbine and/or waste-gate passage, through the GPF, and then to atmosphere. Then the routine ends.

If a tip-in request has not been received, the routine proceeds to 526, where the routine includes adjusting the GPF valves to the GPF bypass mode since neither loading not unloading of soot from the GPF is desired at this time. As previously described, adjusting the GPF valves to a bypass mode includes adjusting the GPF bypass valve to a first position, which allows forward flowing exhaust gas flow to bypass the GPF through the bypass passage. In GPF bypass mode, GPF flow direction selector valve may be adjusted to a first position, which allows exhaust gas to flow in a forward direction to atmosphere, and does not allow exhaust gas to flow in a reverse direction along the exhaust passage to the GPF or into the reverse flow passage. Further, in GPF bypass mode, the GPF recirculation valve may be adjusted to the first position, which does not allow any exhaust flow from the GPF to enter the intake manifold via the recirculation passage. In this way, exhaust gas may flow from the exhaust manifold, through turbine and/or waste-gate passage, through the GPF bypass passage to atmosphere. The routine then ends.

Figure 6:
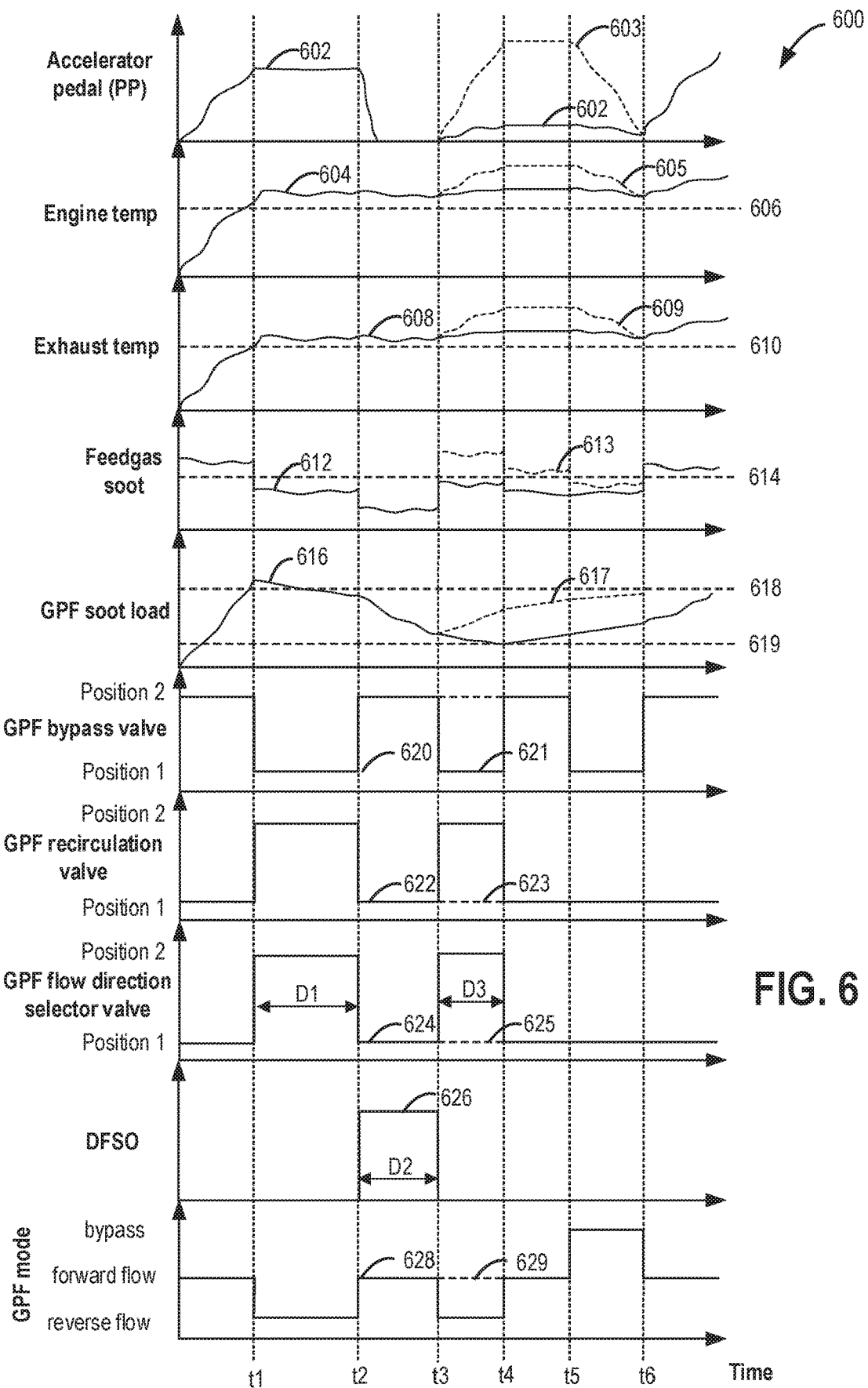
FIG. 6 shows a prophetic example of engine operation to provide forward flow or reverse flow of exhaust through an exhaust GPF.

Turning now to FIG. 6, map 600 shows a prophetic example operation of an engine, including adjusting of GPF valves responsive to engine operating conditions to coordinate GPF purging with GPF regeneration during a DFSO. Map 600 includes various engine parameters along the vertical axis, and elapsed time along the horizontal axis. Map 600 depicts accelerator pedal position (PP) at plot 602, which is indicative of operator torque demand. Map 600 further depicts an engine temperature at plot 604 relative to a warm engine temperature threshold 606, an exhaust temperature at plot 608 relative to a warm exhaust temperature threshold 610, and a feed-gas soot level 612 relative to a feed-gas soot threshold at 614. Plot 616 depicts a soot load of the GPF relative to an upper soot load threshold at 618 and a lower soot load threshold at 619. Plots 620, 622, and 624 depict the positions of the GPF bypass valve, GPF recirculation valve, and GPF flow direction selector valve, respectively. Map 600 also depicts a DFSO mode of operation (on or off) at 626, and the mode of operation of the exhaust system (forward flow, reverse flow or bypass flow) at plot 628.

Prior to time t1, an operator is requesting torque, as indicated by an increasing actuation of the accelerator pedal (plot 602). As a result, the engine temperature increases (plot 604) as does the exhaust temperature (plot 608). As a result of the acceleration, the engine may be operated with a rich air-to fuel ratio (e.g., a lambda less than stoichiometric air-fuel ratio) and as a result of running the engine rich, the feed-gas soot may be elevated (plot 612) above a feed-gas soot threshold (plot 614). The soot load of the particulate filter may increase (plot 616) toward an upper soot threshold 618 as the soot from the feed-gas accumulates into the particulate filter. Because the GPF soot load is below the upper soot threshold 618, but the feed-gas soot is above the feed-gas soot threshold 614, the forward flow mode (plot 628) is selected and the GPF valves are actuated to operate the exhaust system in the forward flow mode so that particulate matter in the exhaust gas may be loaded onto the particulate filter. Specifically, the GPF bypass valve is closed (e.g., position 2) at plot 620, the GPF recirculation valve is closed (e.g., position 1) at plot 622, and the GPF flow direction selector valve is closed (e.g., position 1) at plot 624. In this way, exhaust flow from the engine may flow through the GPF in a forward direction (from the inlet to the outlet of the GPF) and then to the tailpipe. The engine is not operated in DFSO mode (plot 626), as there is an elevated operator torque demand.

At time t1, the operator stops accelerating and requests a steady-state level of torque from the engine, as indicated by maintenance of the accelerator pedal position (plot 602). The engine temperature (604) has increased above a warm engine temperature threshold 606, and an engine exhaust temperature (608) has increased above a warm exhaust temperature threshold 610. The feed-gas soot level drops slightly (plot 612) as the vehicle is no longer accelerating and so may not be operating as rich as prior to time t1. For example, the engine may be operating at or around stoichiometry at this time. Accordingly it is determined that operating conditions are conducive to purging the GPF as the GPF soot load (plot 616) is above an upper GPF soot load threshold 618. To operate the exhaust system in the GPF reverse flow mode (plot 628) so as to purge the GPF, the GPF valves are actuated. Specifically, the GPF bypass valve is opened (e.g., position 1) at plot 620, the GPF recirculation valve is opened (e.g., position 2) at plot 622, and the GPF flow direction selector valve is opened (e.g., position 2) at plot 624. In this way, exhaust flow from the engine may flow through the GPF in a reverse direction (from the outlet to the inlet of the GPF) and to an intake manifold of the engine to purge particulate matter from the GPF for a first duration D1 from t1 to t2 so that the particulate matter may be combusted in cylinders of the engine. This configuration allows the engine to operate in a first mode (e.g., "loading" mode where soot is loaded on the filter) with the engine combusting and exhaust gas directed to a tailpipe while flowing in a first direction through the particulate filter (prior to t2), and then at time t2, the engine is operated in a second mode (e.g., "purging" mode, where soot is purged from the filter to an intake of the engine) with the engine continuing to combust with exhaust being directed to the tailpipe while flowing in a second direction, opposite the first direction, through the particulate filter.

A slow decrease is GPF soot load may occur between t1 and t2 (616), which may bring the GPF soot load below the upper GPF soot load threshold 618. Because there is still operator torque demand, the engine is not operated in DFSO mode (pot 626).

At time t2, there is a decrease in actuation of the accelerator pedal (plot 602). This may be the result of an operator tip-out. Responsive to DFSO conditions being met at time t2, the engine enters DFSO mode (plot 626), and fuel is no longer delivered to cylinders of the engine but intake air may continue to be pumped through the engine and through the exhaust system. As a result, the air-fuel ratio may move toward lean, and the feed-gas soot levels decrease (plot 612) below feed-gas soot threshold 614. At this time, it may be determined that passive regeneration of the GPF may be opportunistically performed during the current DFSO event. Accordingly at time t2, the GPF valves may be actuated to operate the exhaust system in a GPF forward flow mode so that regeneration of the GPF may be opportunistically performed during the DFSO. Specifically, the GPF bypass valve is closed (e.g., position 2) at plot 620, the GPF recirculation valve is closed (e.g., position 1) at plot 622, and the GPF flow direction selector valve is closed (e.g., position 1) at plot 624. In this way, exhaust flow from the engine may flow through the GPF in a forward direction (from the inlet to the outlet of the GPF) and thereon to the tailpipe to facilitate regeneration of the GPF. In the depicted example, regeneration of the GPF occurs for duration D2 of the DFSO, and a corresponding reduction in GPF soot load (616) occurs. It will be appreciated that the rate of soot reduction associated with regeneration may be greater than the rate of soot reduction associated with purging, as shown. This is at least because of the difference in rate and volume of exhaust flow through the GPF during the forward flow versus the reverse flow. In particular, while an entire volume of exhaust flows through the GPF during the forward flow mode (to regenerate the filter during the DFSO), during the reverse flow mode, only a fraction of the entire exhaust flows through the GPF in reverse (to purge the filter) while the remaining flows to the tailpipe while bypass the GPF.

In the depicted embodiment, responsive to an operator tip-out while purging soot from the filter to the engine intake (between t1 and t2), the controller may send a command signal to disable engine fueling and transition to regenerating soot from the particulate filter to the tailpipe. Specifically, the engine may be operated in a third mode (e.g., "regeneration" mode, where soot is regenerated from the filter) with the engine not combusting and exhaust gas flowing directly to the tailpipe while flowing in the first direction through the first direction. The controller may select between the first, second, and third modes described herein based on each of an operator's torque demand a filter soot load. As a result, it is possible to achieve bypassing, purging, loading, and regeneration between an engine start event and a subsequent engine shut down (e.g., during a single, common drive cycle).

At time t3, there is a small tip-in. Because the DFSO between t2 and t3 did not fully regenerate the GPF (e.g., did not reduce the GPF soot load to lower threshold 619), additional reduction of soot loading in the GPF may be desired. Because the feed-gas soot level (plot 612) remains below the feed-gas soot level threshold 614, purging may be initiated by actuating the GPF valves back into the GPF reverse flow mode as occurred between t1 and t2. In this way, further reduction of the GPF soot load may be achieved by purging particulate matter from the GPF to the intake manifold of the engine. In this way, purging may be performed for another duration D3 to further reduce the soot load of the GPF responsive to a duration of the second duration D2 of the previous DFSO event. As a result, the GPF soot load may continue to decrease for the duration D3 until time t4, when the GPF soot load reaches the lower GPF soot load threshold, indicative of a "clean" GPF.

Alternately, at time t3, had there been an aggressive tip-in, as shown by dashed plot 603, the feed-gas soot load may have increased (dashed plot 613) above the feed-gas soot threshold 614 and the controller may have commanded that exhaust gas pass through the GPF in order to load particulate matter on the GPF and reduce particulate emissions. As a result, the controller may have actuated the GPF valves into a forward flow mode (dashed plot 629), where the GPF bypass valve is closed (e.g., position 2) at dashed plot 621, the GPF recirculation valve is closed (e.g., position 1) at plot 623, and the GPF flow direction selector valve is closed (e.g., position 1) at plot 625. In this way, exhaust flow from the engine may flow through the GPF in a forward direction and to the tailpipe to facilitate loading particulate matter on the GPF, thereby increasing the soot load in the GPF (dashed plot 617) rather than reducing it, as would have occurred during purging (plot 616). Additionally, responsive to an aggressive tip-in at t3, the engine temperature 605 and exhaust temperature 609 may have increased further above respective warm temperature thresholds 606 and 610, respectively. In this way, in response to a tip-in event occurring while the engine is operated in the third mode (e.g., regeneration), transitioning to operating the engine in first mode (e.g., loading) when the tip-in is larger, and transitioning to operating in the second mode (e.g., purging) when the tip-in is smaller.

At time t4, the torque demand levels off and acceleration is no longer desired (plot 602), and so the feed-gas soot level is reduced (plot 612). The GPF soot load (616) reaches the lower GPF soot load threshold 619, and so the purging (e.g., reverse flow mode) may end and return to a forward flow mode (plot 628). Alternatively, if the torque demand is as shown by dashed plot 603, the GPF mode would still have been changed to a forward flow mode (plot 628) because of the higher feed-gas soot load (dashed plot 613). As a result, the soot load of the GPF would increase gradually as exhaust flows through the GPF in a forward direction, and particulate matter is deposited in the GPF.

At time t5, the GPF valves may be actuated to a GPF bypass mode (plot 628) as a result of engine temperature (604) being above the warm engine temperature threshold (plot 606), exhaust temperature (plot 608) being above the warm exhaust temperature threshold (plot 610), and feed-gas soot levels (612, 613) being below feed-gas soot threshold 614.

At time t6, another tip-in occurs, similar to the tip-in prior to time t1. Responsive to indications of torque demand (plot 602) and feed-gas soot level (612) above feed-gas soot threshold 614, the GPF valves are actuated to forward flow mode (plot 628) so that particulate matter may be deposited onto the GPF. As previously described, GPF forward flow mode includes decreasing the opening of the GPF bypass valve (e.g., position 2) at plot 620, closing the GPF recirculation valve (e.g., position 1) at plot 622, and closing the GPF flow direction selector valve (e.g., position 1) at plot 624. In this way, exhaust flow from the engine may flow through the GPF in a forward direction so that particulate matter may be loaded onto the GPF.

In one example, the controller may determine if conditions for forward flow through the GPF are met (which includes conditions for reverse flow through the GPF not being met), and in response thereto, the controller may actuate the GPF valves to operate the exhaust system in the forward flow mode. The controller may also determine if conditions for reverse flow through the GPF are met (which includes conditions for each of forward flow and bypass flow through the GPF not being met), and in response thereto, the controller may actuate the GPF valves to operate the exhaust system in the reverse flow mode. The controller may also determine if conditions for reverse flow through the GPF are met (which includes conditions for forward flow through the GPF not being met), and in response thereto, the controller may actuate the GPF valves to operate the exhaust system in the reverse flow mode. In some examples, actuating the valves to the forward flow mode occurs while the valves were actuated to the reverse flow mode, and actuating the valves to the reverse flow mode occurs while the valves were actuated to the forward flow mode. In this way, particulate filter cleaning may be improved while reducing the reliance on a fuel intensive active regeneration of the filter. By continuously flowing a smaller portion of total exhaust flow from an outlet of the filter to an inlet of the filter when the engine is running fueled, soot may be removed from the filter at a slower rate over a longer duration of a drive cycle and incinerated in engine cylinders. In comparison, by intermittently flowing the total exhaust flow from the inlet of the filter to the outlet of the filter when the engine is running unfueled, soot may be removed from the filter at a higher rate over a shorter duration of a drive cycle and incinerated locally at the filter. By coordinating the removal of soot from the filter using reverse flow through the filter during unfueled engine operation with the removal of soot using forward flow through the filter over fueled engine operation, a more complete cleaning of the filter can be achieved over a drive cycle. By reducing the need for active regeneration of the filter, fuel economy of the engine is improved. In addition, exhaust backpressure related issues are addressed. By relying on a branched exhaust passage system including multiple valves to control the direction and amount of exhaust flow through the filter, filter cleaning can be improved despite the downstream location and packaging of the filter in the under-hood area of a vehicle. By adjusting the ratio of HP-EGR to LP-EGR provided to an engine responsive to the ingestion of soot from the GPF at the engine, engine dilution and combustion stability can be maintained even as torque changes. The technical effect of purging the GPF to the intake manifold of the engine is that the soot load of the GPF may be reduced across a wide range of engine operating conditions, with reduced reliance on active regeneration.

An example method for an engine includes: while spinning an engine fueled, purging soot from a loaded particulate filter to an engine intake using reverse flow of exhaust gas through the filter; and while spinning the engine unfueled, regenerating soot from the loaded particulate filter and flowing to a tailpipe using forward flow of air through the filter. In a first example of the method, the method further includes wherein purging soot using the reverse flow of exhaust gas includes flowing a first, smaller portion of exhaust gas from an exhaust manifold into an outlet of the filter, and then from an inlet of the filter to the engine intake, while flowing a second remaining portion of exhaust gas from the exhaust manifold to the tailpipe while bypassing the filter. A second example of the method optionally includes the first example and further includes wherein the second portion of exhaust gas flows to the tailpipe via one or more of an exhaust turbine and a waste-gate passage bypassing the turbine. A third example of the method optionally includes one or more of the first and second examples, and further includes wherein regenerating soot and flowing to the tailpipe using the forward flow of air includes flowing air from the exhaust manifold into the inlet of the filter, and then from the inlet of the filter to the tailpipe. A fourth example of the method optionally includes one or more of the first through third examples, and further includes wherein purging using reverse flow includes flowing exhaust gas from the exhaust manifold into a first passage coupled to filter, wherein regenerating using forward flow includes flowing air from the exhaust manifold into a second, different passage coupled to the filter, wherein the first passage and the second passage are distinct passages overlapping at the filter. A fifth example of the method optionally includes one or more of the first through fourth examples, and further includes, wherein the first passage is fluidically coupled to an exhaust gas recirculation (EGR) passage recirculating exhaust gas from the exhaust manifold to the engine intake, downstream of an intake compressor. A sixth example of the method optionally includes one or more of the first through fifth examples, and further includes adjusting EGR flow via an EGR passage responsive to the purging to the engine intake, the adjusting including reducing EGR flow as the amount of soot purged to the engine intake increases, the EGR flow including one or more of high pressure EGR flow and low pressure EGR flow. A seventh example of the method optionally includes one or more of the first through sixth examples, and further includes, responsive to an operator tip-out while purging soot from the filter to the engine intake, disabling engine fueling and transitioning to regenerating soot from the filter to the tailpipe. An eighth example of the method optionally includes one or more of the first through seventh examples, and further includes wherein the purging soot from the filter and the regenerating soot from the filter occur on a common vehicle drive cycle (that is, between the same engine start and the same engine shutdown event). A ninth example of the method optionally includes one or more of the first through eighth examples, and further includes one or more of the first through eighth examples, and further includes while purging soot from the filter, adjusting a motor torque supplied to the exhaust turbine based on operator torque demand, the motor torque increased as the operator torque demand increases, and while regenerating soot from the filter, adjusting the motor torque supplied to the exhaust turbine based on soot load on the filter, the motor torque increased as the soot load on the filter increases.

In another example, a method for an engine includes operating an engine in a first mode with the engine combusting and exhaust directed to a tailpipe while flowing in a first direction through a particulate filter; and operating the engine in a second mode with the engine combusting and exhaust directed to the tailpipe while flowing in a second direction, opposite the first direction, through the particulate filter. In a first example of the method, the method further includes operating the engine in a third mode with the engine not combusting and air directed to the tailpipe while flowing in the first direction through the particulate filter; and selecting between the first, second, and third mode based on each of operator torque demand and filter soot load. A second example of the method optionally includes the first example and further includes wherein soot is loaded on the filter when the engine is operated in the first mode, wherein soot is purged from the filter to an engine intake when the engine is operated in the second mode, and wherein soot is regenerated from the filter when the engine is operated in the third mode. A third example of the method optionally includes one or more of the first and second examples, and further includes wherein operating in the first mode or the third mode includes actuating a first valve, coupling an exhaust manifold to a tailpipe upstream of the filter, to a first position of the first valve and actuating a second valve, coupling the exhaust manifold to the tailpipe downstream of the filter, to a first position of the second valve, and wherein operating in the second mode includes actuating the first valve to a second position of the first valve and actuating the second valve to a second position of the second valve. A fourth example of the method optionally includes one or more of the first through third examples, and further includes wherein operating in the second mode further includes opening a third valve in a recirculation passage coupling an inlet of the filter to the engine intake, downstream of an intake throttle. A fifth example of the method optionally includes one or more of the first through fourth examples, and further includes, wherein the selecting includes: selecting the first mode when operator torque demand is higher than a threshold demand and filter soot load is lower than a threshold load; selecting the second mode when operator torque demand is higher than the threshold demand and filter soot load is higher than the threshold load; and selecting the third mode when operator torque demand is lower than the threshold demand and filter soot load is higher than the threshold load. A sixth example of the method optionally includes one or more of the first through fifth examples, and further includes, in response to a tip-out event occurring while the engine is operated in the second mode, transitioning to operating the engine in the third mode; and in response to a tip-in event occurring while the engine is operated in the third mode, transitioning to operating the engine in first mode when the tip-in is larger, and transitioning to operating in the second mode when the tip-in is smaller.

A system for an engine includes an intake manifold and an exhaust manifold; a turbocharger having a turbine coupled to the exhaust manifold, a compressor coupled to the intake manifold, a shaft mechanically coupling the turbine to the compressor, and an electric motor coupled the shaft; an exhaust particulate matter filter; a first exhaust passage coupling the exhaust manifold to a tailpipe via the turbine, the first exhaust passage including a first valve coupled upstream of an inlet of the filter; a waste-gate including a waste-gate valve coupled across the turbine; a second exhaust passage coupling the exhaust manifold to the tailpipe while bypassing the turbine, the second passage including a second valve coupled downstream of an outlet of the filter; a third exhaust passage coupling the inlet of the filter to the engine intake manifold, downstream of the compressor, the third passage including a third valve; and a controller with computer readable instructions stored on non-transitory memory for: responsive to each of operator torque demand and filter soot load, adjusting a position of each of the first, second, and third valve to vary a direction of flow through the filter between a first flow from the exhaust manifold to the inlet of the filter and then from the outlet of the filter to the tailpipe, and a second flow from the exhaust manifold to the outlet of the filter, and then from the inlet of the filter to the intake manifold. In a first example of the system, adjusting includes: when operator torque demand is higher than a threshold demand and filter soot load is lower than a threshold load, or when operator torque demand is lower than the threshold demand and filter soot load is higher than the threshold load, actuating each of the first and second valves to a corresponding first position, and closing the third valve to provide the first flow through the filter; and when operator torque demand is higher than the threshold demand and filter soot load is higher than the threshold load, actuating each of the first and second valves to a corresponding second position, and opening the third valve to provide the second flow through the filter. A second example of the system optionally includes the first example and further includes an exhaust gas recirculation (EGR) passage coupling the exhaust manifold, downstream of the filter to the engine intake manifold, upstream of the compressor, the EGR passage including an EGR valve, wherein the controller includes further instructions for: when operating with the second flow through the filter, reducing an opening of the EGR valve as an opening of the third valve increases; and when operating with the second flow through the filter, reducing the opening of the EGR valve as an engine dilution demand decreases.

In another representation, the vehicle system is a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
  while spinning an engine fueled, purging soot from a loaded particulate filter to an engine intake using reverse flow of exhaust gas through the filter; and
  while spinning the engine unfueled, regenerating soot from the filter and flowing to a tailpipe using forward flow of air through the filter, wherein purging soot using the reverse flow of exhaust gas includes flowing a first, smaller portion of exhaust gas from an exhaust manifold into an outlet of the filter, and then from an inlet of the filter to the engine intake, while flowing a second, remaining portion of exhaust gas from the exhaust manifold to the tailpipe while bypassing the filter.

2. The method of claim 1, wherein the second portion of exhaust gas flows to the tailpipe via one or more of an exhaust turbine and a waste-gate passage bypassing the turbine.

3. The method of claim 2, wherein regenerating soot and flowing to the tailpipe using the forward flow of air includes flowing air from the exhaust manifold into the inlet of the filter, and then from the inlet of the filter to the tailpipe.

4. The method of claim 1, wherein purging using reverse flow of exhaust gas includes flowing exhaust gas from the exhaust manifold into a first passage coupled to the filter, wherein regenerating using forward flow of air includes flowing air from the exhaust manifold into a second, different passage coupled to the filter, and wherein the first passage and the second passage are distinct passages overlapping at the filter.

5. The method of claim 4, wherein the first passage is fluidically coupled to an exhaust gas recirculation (EGR) passage recirculating exhaust gas from the exhaust manifold to the engine intake, downstream of an intake compressor.

6. The method of claim 1, further comprising adjusting exhaust gas recirculation (EGR) flow via an EGR passage responsive to the purging to the engine intake, the adjusting including reducing EGR flow as an amount of soot purged to the engine intake increases, the EGR flow including one or more of high pressure EGR flow and low pressure EGR flow.

7. The method of claim 1, further comprising, responsive to an operator tip-out while purging soot from the filter to the engine intake, disabling engine fueling and transitioning to regenerating soot from the filter to the tailpipe.

8. The method of claim 1, wherein the purging soot from the filter and the regenerating soot from the filter occur on a common vehicle drive cycle.

9. The method of claim 2, further comprising, while purging soot from the filter, adjusting a motor torque supplied to the exhaust turbine based on operator torque demand, the motor torque increased as the operator torque demand increases, and, while regenerating soot from the filter, adjusting the motor torque supplied to the exhaust turbine based on a soot load on the filter, the motor torque increased as the soot load on the filter increases.

10. A method, comprising:
  operating an engine in a first mode with the engine combusting and exhaust directed to a tailpipe while flowing in a first direction through a particulate filter; and
  operating the engine in a second mode with the engine combusting and forward-flowing exhaust directed from an exhaust manifold to the tailpipe, the second mode further including reverse-flowing exhaust in a second direction, opposite the first direction, from the exhaust manifold through the particulate filter and then to an intake manifold;
  operating the engine in a third mode with the engine not combusting and air directed to the tailpipe while flowing in the first direction through the particulate filter; and
  selecting between the first, second, and third modes based on each of operator torque demand and particulate filter soot load.

11. The method of claim 10, wherein soot is loaded on the particulate filter when the engine is operated in the first mode, wherein soot is purged from the particulate filter to an engine intake manifold when the engine is operated in the second mode, and wherein soot is regenerated from the particulate filter when the engine is operated in the third mode.

12. The method of claim 11, wherein operating in the first mode or the third mode includes actuating a first valve, coupling the exhaust manifold to the tailpipe upstream of the particulate filter, to a first position of the first valve and actuating a second valve, coupling the exhaust manifold to the tailpipe downstream of the particulate filter, to a first position of the second valve, and wherein operating in the second mode includes actuating the first valve to a second position of the first valve and actuating the second valve to a second position of the second valve.

13. The method of claim 12, wherein operating in the second mode further includes opening a third valve in a recirculation passage coupling an inlet of the particulate filter to the engine intake manifold, downstream of an intake throttle.

14. The method of claim 10, wherein the selecting includes:
   selecting the first mode when operator torque demand is higher than a threshold demand and particulate filter soot load is lower than a threshold load;
   selecting the second mode when operator torque demand is higher than the threshold demand and particulate filter soot load is higher than the threshold load; and
   selecting the third mode when operator torque demand is lower than the threshold demand and particulate filter soot load is higher than the threshold load.

15. The method of claim 12, further comprising:
   in response to a tip-out event occurring while the engine is operated in the second mode, transitioning to operating the engine in the third mode; and
   in response to a tip-in event occurring while the engine is operated in the third mode, transitioning to operating the engine in the first mode when the tip-in is larger and transitioning to operating in the second mode when the tip-in is smaller.

16. An engine system, comprising:
   an engine having an intake manifold and an exhaust manifold;
   a turbocharger having a turbine coupled to the exhaust manifold, a compressor coupled to the intake manifold, a shaft mechanically coupling the turbine to the compressor, and an electric motor coupled to the shaft;
   an exhaust particulate matter filter;
   a first exhaust passage coupling the exhaust manifold to a tailpipe via the turbine, the first exhaust passage including a first valve coupled upstream of an inlet of the filter;
   a waste-gate including a waste-gate valve coupled across the turbine;
   a second exhaust passage coupling the exhaust manifold to the tailpipe while bypassing the turbine, the second passage including a second valve coupled downstream of an outlet of the filter;
   a third exhaust passage coupling the inlet of the filter to the engine intake manifold, downstream of the compressor, the third passage including a third valve; and
   a controller with computer readable instructions stored on non-transitory memory for:
      responsive to each of operator torque demand and filter soot load, adjusting a position of each of the first, second, and third valves to vary a direction of flow through the filter between a first flow from the exhaust manifold to the inlet of the filter and then from the outlet of the filter to the tailpipe, and a second flow from the exhaust manifold to the outlet of the filter, and then from the inlet of the filter to the intake manifold.

17. The system of claim 16, wherein the adjusting includes:
   when operator torque demand is higher than a threshold demand and filter soot load is lower than a threshold load, or when operator torque demand is lower than the threshold demand and filter soot load is higher than the threshold load, actuating each of the first and second valves to a corresponding first position and closing the third valve to provide the first flow through the filter; and
   when operator torque demand is higher than the threshold demand and filter soot load is higher than the threshold load, actuating each of the first and second valves to a corresponding second position and opening the third valve to provide the second flow through the filter.

18. The system of claim 16, further comprising an exhaust gas recirculation (EGR) passage coupling the exhaust manifold, downstream of the filter, to the engine intake manifold, upstream of the compressor, the EGR passage including an EGR valve, wherein the controller includes further instructions for:
   when operating with the second flow through the filter, reducing an opening of the EGR valve as an opening of the third valve increases; and
   when operating with the first flow through the filter, reducing the opening of the EGR valve as an engine dilution demand decreases.

* * * * *